United States Patent
Itamochi et al.

(10) Patent No.: US 12,062,498 B2
(45) Date of Patent: Aug. 13, 2024

(54) MULTILAYER CERAMIC ELECTRONIC COMPONENT

(71) Applicant: Murata Manufacturing Co., Ltd., Nagaokakyo (JP)

(72) Inventors: Takeshi Itamochi, Nagaokakyo (JP); Yoshiyuki Nomura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 105 days.

(21) Appl. No.: 17/959,334

(22) Filed: Oct. 4, 2022

(65) Prior Publication Data

US 2023/0113957 A1 Apr. 13, 2023

(30) Foreign Application Priority Data

Oct. 11, 2021 (JP) ................. 2021-166942

(51) Int. Cl.
*H01G 4/30* (2006.01)
*H01G 2/06* (2006.01)
*H01G 4/008* (2006.01)
*H01G 4/012* (2006.01)
*H01G 4/12* (2006.01)
*H01G 4/232* (2006.01)

(52) U.S. Cl.
CPC ............ *H01G 4/30* (2013.01); *H01G 2/065* (2013.01); *H01G 4/008* (2013.01); *H01G 4/012* (2013.01); *H01G 4/1227* (2013.01); *H01G 4/2325* (2013.01)

(58) Field of Classification Search
CPC .......... H01G 4/30; H01G 2/065; H01G 4/008; H01G 4/012; H01G 4/1227; H01G 4/2325
See application file for complete search history.

(56) References Cited

U.S. PATENT DOCUMENTS

| 10,366,834 | B1* | 7/2019 | Lee | ................. H01G 4/012 |
| 10,770,232 | B2* | 9/2020 | Han | ................. H01G 4/232 |
| 2005/0276002 | A1* | 12/2005 | Sridharan | ............... C03C 8/14 |
| | | | | 361/321.1 |

(Continued)

FOREIGN PATENT DOCUMENTS

| JP | 11-162771 A | 6/1999 |
| JP | 2005167010 A | 6/2005 |

OTHER PUBLICATIONS

Office Action in JP2021-166942, mailed Feb. 20, 2024, 13 pages.

*Primary Examiner* — Michael P McFadden
(74) *Attorney, Agent, or Firm* — Keating & Bennett, LLP

(57) ABSTRACT

A multilayer ceramic capacitor includes a multilayer body including laminated ceramic layers, first and second principal surfaces in a height direction, first and second lateral surfaces in a width direction, and first and second end surfaces in a length direction, first and second internal electrode layers on the ceramic layers and respectively exposed to the first and second end surfaces, first and second external electrodes respectively electrically connected to the first and second internal electrode layers, and portions of the first and second principal surfaces and the first and second lateral surfaces. The first and second external electrodes each include an underlying electrode layer including a metal component, a plating layer on the underlying electrode layer, and a fatty acid on at least a surface of the underlying electrode layer.

18 Claims, 9 Drawing Sheets

(56) References Cited

U.S. PATENT DOCUMENTS

| | | | |
|---|---|---|---|
| 2007/0014074 A1* | 1/2007 | Yoon | H01G 4/30 |
| | | | 361/305 |
| 2011/0132637 A1* | 6/2011 | Otani | C08L 63/00 |
| | | | 252/514 |
| 2012/0162855 A1* | 6/2012 | Suh | H01B 1/22 |
| | | | 977/779 |
| 2018/0166215 A1* | 6/2018 | Hamanaka | H01G 4/12 |
| 2021/0375543 A1* | 12/2021 | Koo | H01G 4/12 |

* cited by examiner

III-III CROSS-SECTIONAL VIEW

IV-IV CROSS-SECTIONAL VIEW

V-V CROSS-SECTIONAL VIEW

VI-VI CROSS-SECTIONAL VIEW

ENLARGED VIEW OF PART A

ENLARGED VIEW OF PART B

MULTILAYER CERAMIC ELECTRONIC COMPONENT

CROSS REFERENCE TO RELATED APPLICATIONS

This application claims the benefit of priority to Japanese Patent Application No. 2021-166942 filed on Oct. 11, 2021. The entire contents of this application are hereby incorporated herein by reference.

BACKGROUND OF THE INVENTION

1. Field of the Invention

The present invention relates to a multilayer ceramic electronic component.

2. Description of the Related Art

In recent years, ceramic electronic components such as multilayer ceramic capacitors have come to be used under harsher environments than before. For example, an electronic component used in a mobile device such as a mobile phone or a portable music player is required to withstand an impact upon dropping. Specifically, it is required that the electronic component be prevented from dropping off from a mounting substrate or be prevented from cracking when the electronic component is subjected to a drop impact.

Further, an electronic component used in an in-vehicle device such as an electronic control unit (ECU) is required to withstand an impact caused by thermal cycles. Specifically, it is required that the electronic component be prevented from cracking when the electronic component is subjected to bending stress generated by thermal expansion and contraction of a mounting substrate due to thermal cycles.

Therefore, it has been proposed to use a thermosetting resin paste for an external electrode of a ceramic electronic component. For example, in Japanese Patent Laid-Open No. H11-162771, an epoxy-based thermosetting resin layer is formed between a conventional electrode layer and a Ni plating layer, and measures are taken to prevent a capacitor main body from cracking even under a severe environment (improvement of bending resistance).

In such a configuration, when stress is generated by a drop impact or bending stress is generated by thermal expansion and contraction of a mounting substrate due to thermal cycles, the stress transmitted through the mounting substrate (deformation of the mounting substrate) is released between the electrode layer and the epoxy-based thermosetting resin layer with a tip of the epoxy-based thermosetting resin as the starting-point, so as to prevent a ceramic electronic component main body (multilayer body) from cracking.

Even with the structure disclosed in Japanese Patent Laid-Open No. H11-162771, however, absorption of stress by the thermosetting resin or release of stress by separability is insufficient depending on the design of the multilayer ceramic capacitor, which possibly causes the ceramic electronic component main body to crack.

SUMMARY OF THE INVENTION

Preferred embodiments of the present invention provide multilayer ceramic electronic components that are each able to effectively reduce or prevent cracking.

A multilayer ceramic electronic component according to a preferred embodiment of the present invention includes a multilayer body including a plurality of ceramic layers, the plurality of ceramic layers being laminated, the multilayer body including a first principal surface and a second principal surface on opposite sides of the multilayer body in a height direction, a first lateral surface and a second lateral surface on opposite sides of the multilayer body in a width direction orthogonal or substantially orthogonal to the height direction, and a first end surface and a second end surface on opposite sides of the multilayer body in a length direction orthogonal or substantially orthogonal to the height direction and the width direction, a first internal electrode layer on the plurality of ceramic layers and located inside the multilayer body, a second internal electrode layer on the plurality of ceramic layers and located inside the multilayer body, a first external electrode on the first end surface, a portion of the first principal surface, a portion of the second principal surface, a portion of the first lateral surface, and a portion of the second lateral surface, and a second external electrode on the second end surface, a portion of the first principal surface, a portion of the second principal surface, a part of the first lateral surface, and a portion of the second lateral surface. The first external electrode and the second external electrode each include an underlying electrode layer including a metal component, and a plating layer on the underlying electrode layer, and a fatty acid is provided on at least a surface of the underlying electrode layer.

In the multilayer ceramic electronic component described above, the fatty acid is provided on at least the surface of the underlying electrode layer, so that a carboxy group of the fatty acid is ionized and adsorbed to the underlying electrode layer by an ion binding force, and plating of the plating layer on the underlying electrode layer is reduced or prevented from being deposited at the adsorption portion, thus enabling a reduction in bonding area between the underlying electrode layer and the plating layer. This causes a reduction in adhesion between the underlying electrode layer and the plating layer, so that an advantageous effect of making the underlying electrode layer and the plating layer on the underlying electrode layer easy to separate from each other is provided.

Therefore, when an impact upon dropping or an impact caused by thermal cycles is applied to the multilayer ceramic electronic component, the underlying electrode layer and the plating layer can be stably separated, and stress can be released accordingly. As a result, it is possible to reduce or prevent the multilayer ceramic electronic component from cracking.

Further, in the multilayer ceramic electronic component described above, a case where no conductive resin layer is provided on the external electrodes enables not only a reduction in cost but also an increase in the degree of freedom in design of the multilayer body by the thickness of the conductive resin layer, so that it is possible to make the capacitance larger.

According to preferred embodiments of the present invention, it is possible to provide multilayer ceramic electronic components that are each able to effectively reduce or prevent cracking.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Capacitor

As an example of a multilayer ceramic electronic component according to a preferred embodiment of the present invention, a multilayer ceramic capacitor will be described.

Figure 1:
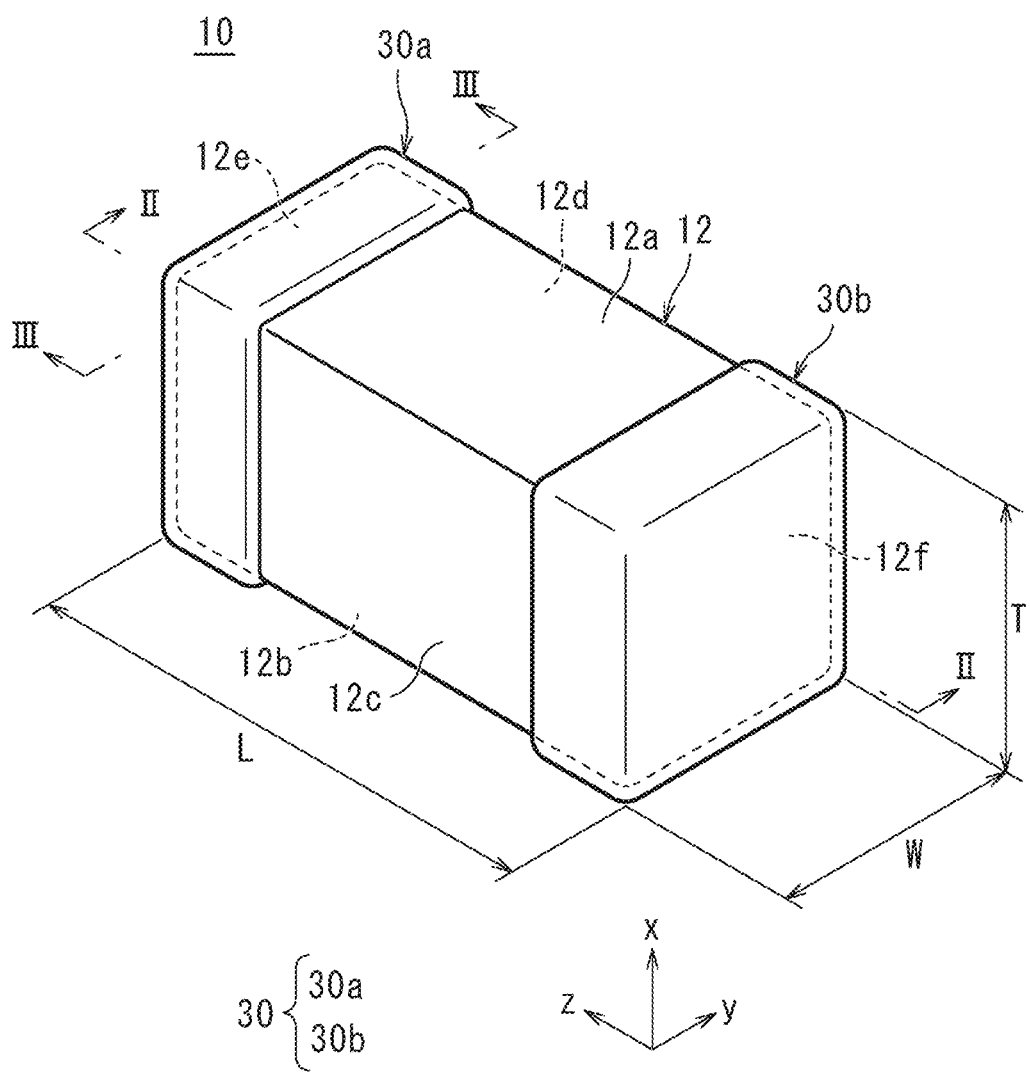
FIG. 1 is an external perspective view of an example of a multilayer ceramic capacitor as a multilayer ceramic electronic component according to a preferred embodiment of the present invention.
Figure 2:
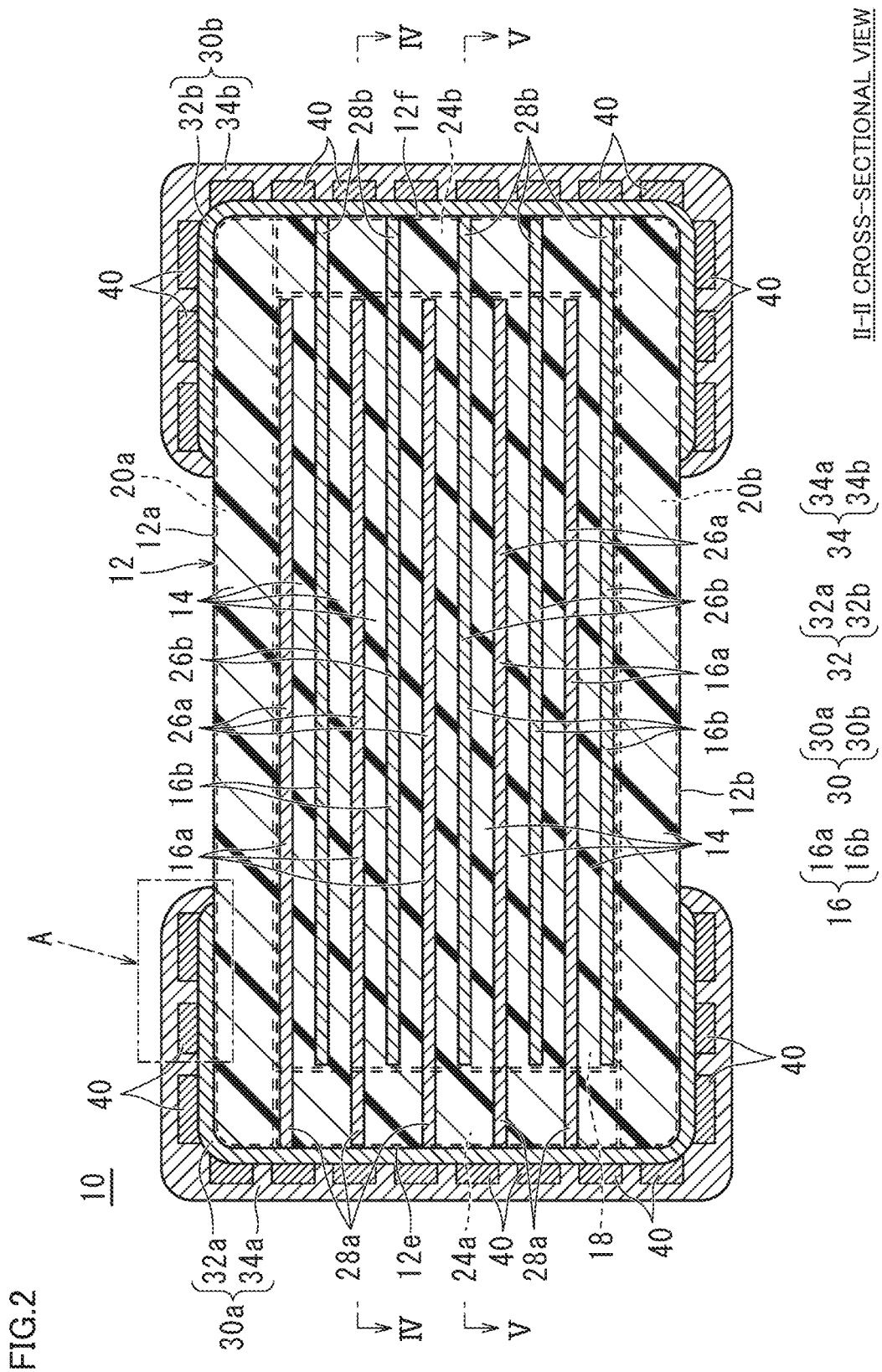
FIG. 2 is a cross-sectional view taken along line II-II in FIG. 1.
Figure 3:
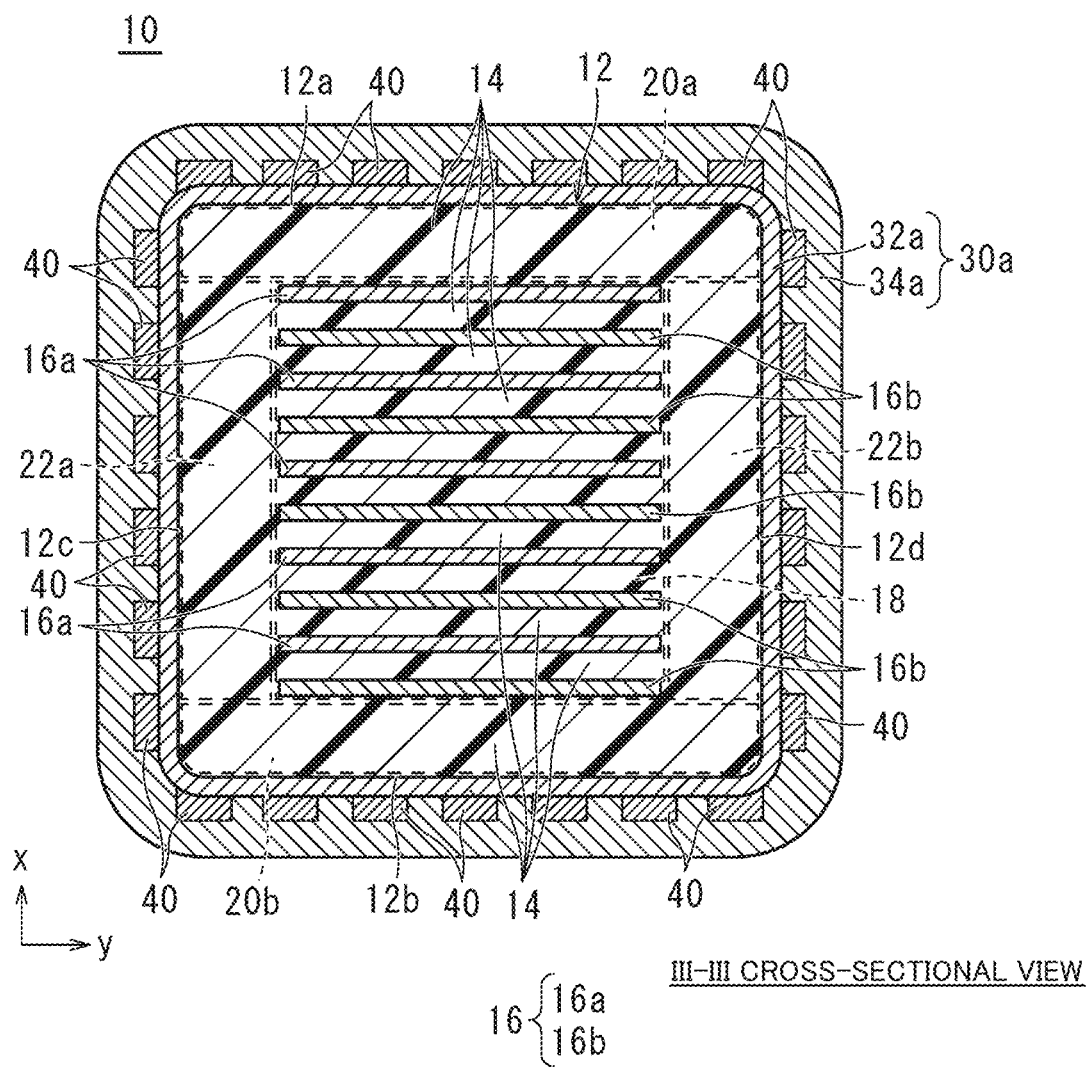
FIG. 3 is a cross-sectional view taken along line III-III in FIG. 1.
Figure 4:
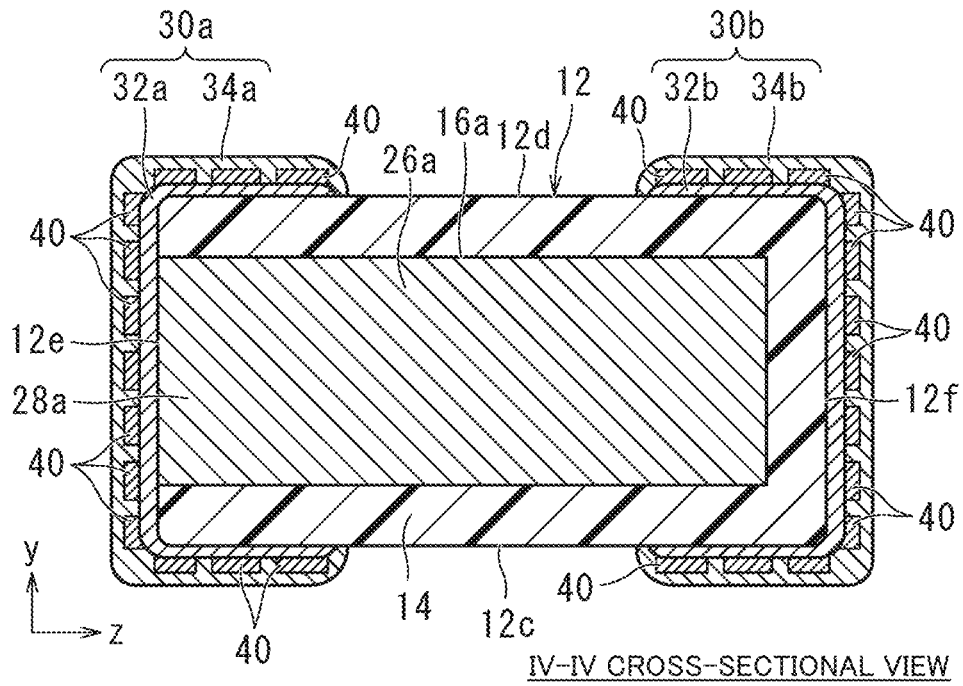
FIG. 4 is a cross-sectional view taken along line IV-IV in FIG. 2.
Figure 5:
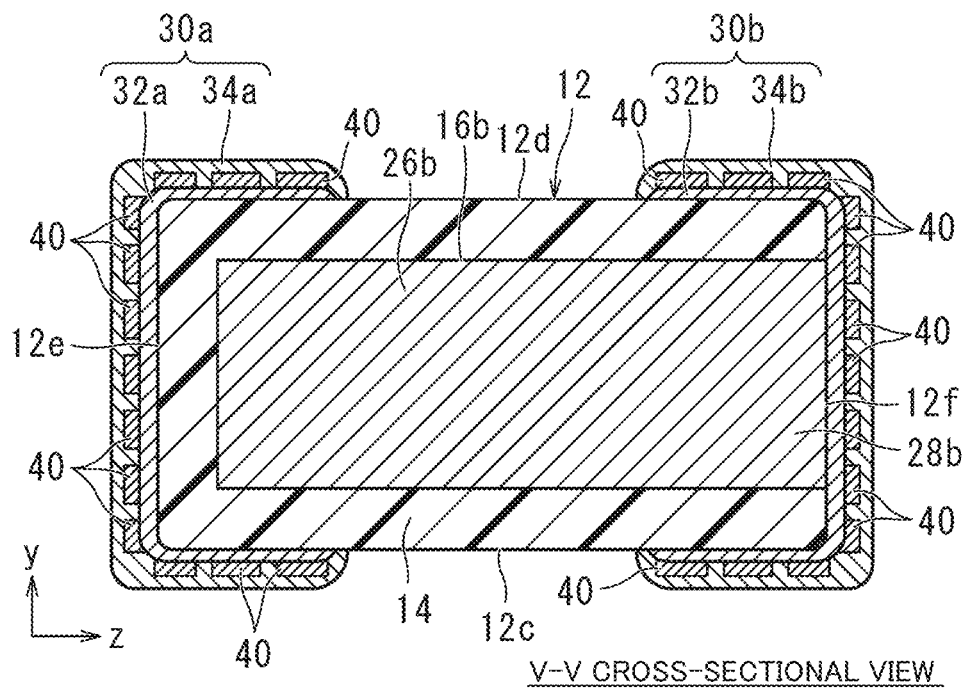
FIG. 5 is a cross-sectional view taken along line V-V in FIG. 2.

FIG. 1 is an external perspective view of an example of the multilayer ceramic capacitor as the multilayer ceramic electronic component according to the present preferred embodiment of the present invention. FIG. 2 is a cross-sectional view taken along line II-II in FIG. 1. FIG. 3 is a cross-sectional view taken along line III-III in FIG. 1. FIG. 4 is a cross-sectional view taken along line IV-IV in FIG. 2. FIG. 5 is a cross-sectional view taken along line V-V in FIG. 2.

As illustrated in FIGS. 1 to 3, a multilayer ceramic capacitor 10 includes a multilayer body 12 having a rectangular or substantially rectangular parallelepiped shape, and an external electrode 30 disposed at both ends of multilayer body 12.

Multilayer body 12 includes a plurality of laminated ceramic layers 14 and a plurality of internal electrode layers 16 each laminated on a corresponding one of ceramic layers 14. Furthermore, multilayer body 12 includes a first principal surface 12a and a second principal surface 12b on opposite sides of multilayer body 12 in a height direction x, a first lateral surface 12c and a second lateral surface 12d on opposite sides of multilayer body 12 in a width direction y orthogonal or substantially orthogonal to height direction x, and a first end surface 12e and a second end surface 12f on opposite sides of multilayer body 12 in a length direction z orthogonal or substantially orthogonal to height direction x and width direction y. Multilayer body 12 may include rounded corners and edges. Each of the corners is a portion where three adjacent surfaces of the multilayer body meet each other, and each of the edges is a portion where two adjacent surfaces of the multilayer body meet each other. Further, irregularities or the like may be provided on a portion or all of first principal surface 12a and second principal surface 12b, first lateral surface 12c and second lateral surface 12d, and first end surface 12e and second end surface 12f. Ceramic layers 14 and internal electrode layers 16 are laminated in height direction x.

Multilayer body 12 includes an inner layer portion 18 including one or a plurality of ceramic layers 14 and a plurality of internal electrode layers 16 each disposed on a corresponding ceramic layer 14. Internal electrode layers 16 include a first internal electrode layer 16a extending to first end surface 12e and a second internal electrode layer 16b extending to second end surface 12f, and in inner layer portion 18, a plurality of first internal electrode layers 16a and a plurality of second internal electrode layers 16b face each other with a corresponding ceramic layer 14 interposed between each first internal electrode layer 16a and each second internal electrode layer 16b.

Multilayer body 12 includes a first principal surface side outer layer portion 20a that is located adjacent to first principal surface 12a and includes a plurality of ceramic layers 14 located between first principal surface 12a, and an outermost surface of inner layer portion 18 adjacent to first principal surface 12a and linear extensions from the outermost surface.

Similarly, multilayer body 12 includes a second principal surface side outer layer portion 20b that is located adjacent to second principal surface 12b and includes a plurality of ceramic layers 14 located between second principal surface 12b, and an outermost surface of inner layer portion 18 adjacent to second principal surface 12b and linear extensions from the outermost surface.

Multilayer body 12 includes a first lateral surface side outer layer portion 22a that is located adjacent to first lateral surface 12c and includes a plurality of ceramic layers 14 located between first lateral surface 12c and an outermost surface of inner layer part 18 adjacent to first lateral surface 12c.

Similarly, multilayer body 12 includes a second lateral surface side outer layer portion 22b that is located adjacent to second lateral surface 12d and includes a plurality of ceramic layers 14 located between second lateral surface 12*d* and an outermost surface of inner layer part 18 adjacent to second lateral surface 12*d*.

Multilayer body 12 includes a first end surface side outer layer portion 24*a* that is located adjacent to first end surface 12*e* and includes a plurality of ceramic layers 14 located between first end surface 12*e* and an outermost surface of inner layer part 18 adjacent to first end surface 12*e*.

Similarly, multilayer body 12 includes a second end surface side outer layer portion 24*b* that is located adjacent to second end surface 12*f* and includes a plurality of ceramic layers 14 located between second end surface 12*f* and an outermost surface of inner layer part 18 adjacent to second end surface 12*f*.

First principal surface side outer layer portion 20*a* is located adjacent to first principal surface 12*a* of multilayer body 12 and is an aggregate of a plurality of ceramic layers 14 located between first principal surface 12*a* and internal electrode layer 16 closest to first principal surface 12*a*.

Second principal surface side outer layer portion 20*b* is located adjacent to second principal surface 12*b* of multilayer body 12 and is an aggregate of a plurality of ceramic layers 14 located between second principal surface 12*b* and internal electrode layer 16 closest to second principal surface 12*b*.

There is no particular limitation on dimensions of multilayer body 12, but it is preferable, for example, that a dimension in length direction z is greater than or equal to about 0.186 mm and less than or equal to about 9.59 mm, a dimension in width direction y is greater than or equal to about 0.086 mm and less than or equal to about 9.59 mm, and a dimension in height direction x is greater than or equal to about 0.086 mm and less than or equal to about 9.59 mm.

Ceramic layers 14 may be made of, for example, a dielectric material as a ceramic material. As such a dielectric material, for example, a dielectric ceramic containing a component such as $BaTiO_3$, $CaTiO_3$, $SrTiO_3$, or $CaZrO_3$ may be used. In a case where the dielectric material is included as a principal component, depending on desired characteristics of multilayer body 12, for example, a material to which an accessory component smaller in content than the principal component such as an Mn compound, an Fe compound, a Cr compound, a Co compound, or an Ni compound is added may be used.

In a case where a piezoelectric ceramic material is used for ceramic layers 14, the multilayer ceramic electronic component defines and functions as a piezoelectric component. Specific examples of the piezoelectric ceramic material include a lead zirconate titanate (PZT)-based ceramic material.

Further, in a case where a semiconductor ceramic material is used for ceramic layers 14, the multilayer ceramic electronic component defines and functions as a thermistor. Specific examples of the semiconductor ceramic material include a spinel-based ceramic material.

Further, in case where a magnetic ceramic material is used for ceramic layers 14, the multilayer ceramic electronic component defines and functions as an inductor. Further, in a case where the multilayer ceramic electronic component defines and functions as an inductor, internal electrode layer 16 is a coil-shaped conductor. Specific examples of the magnetic ceramic material include a ferrite ceramic material.

A thickness of each ceramic layer 14 after being fired is preferably, for example, greater than or equal to about 0.5 μm and less than or equal to about 15 μm. The number of ceramic layers 14 to be laminated is preferably, for example, greater than or equal to 10 and less than or equal to 700. The number of ceramic layers 14 is a total number of ceramic layers 14 in inner layer portion 18 and ceramic layers 14 in first principal surface side outer layer portion 20*a* and second principal surface side outer layer part 20*b*.

Multilayer body 12 includes, as the plurality of internal electrode layers 16, a plurality of first internal electrode layers 16*a* and a plurality of second internal electrode layers 16*b* each having a rectangular or approximately rectangular shape, for example. The plurality of first internal electrode layers 16*a* and the plurality of second internal electrode layers 16*b* are embedded so as to be alternately arranged at equal or substantially equal intervals in height direction x of multilayer body 12 with a corresponding ceramic layer 14 interposed between each of first internal electrode layers 16*a* and each of second internal electrode layers 16*b*.

As illustrated in FIG. 4, first internal electrode layers 16*a* are each disposed on a corresponding one of the plurality of ceramic layers 14 and located inside multilayer body 12. First internal electrode layers 16*a* each include a first counter electrode portion 26*a* facing a corresponding second internal electrode layer 16*b*, and a first extended electrode portion 28*a* located on one end of first internal electrode layer 16*a* and extending from first counter electrode portion 26*a* to first end surface 12*e* of multilayer body 12. First extended electrode portion 28*a* includes an end extended to the surface of first end surface 12*e* and exposed from multilayer body 12.

A shape of first counter electrode portion 26*a* of each first internal electrode layer 16*a* is preferably, but not particularly limited a to, rectangular or substantially rectangular shape as viewed from above, for example. Corners as viewed from above may be rounded or chamfered (tapered). Alternatively, a tapered shape in which an inclination is provided in either direction as viewed from above may be used.

A shape of first extended electrode portion 28*a* of each first internal electrode layer 16*a* is preferably, but not particularly limited to, a rectangular or substantially rectangular shape as viewed from above, for example. Corners as viewed from above may be rounded or chamfered (tapered). Alternatively, a tapered shape in which an inclination is provided in either direction as viewed from above may be used.

A width of first counter electrode portion 26*a* of each first internal electrode layer 16*a* and a width of first extended electrode portion 28*a* of each first internal electrode layer 16*a* may be the same or substantially the same, or either one of the widths may be smaller than the other.

As illustrated in FIG. 5, second internal electrode layers 16*b* are each disposed on a corresponding one of the plurality of ceramic layers 14 and located inside multilayer body 12. Second internal electrode layers 16*b* each include a second counter electrode portion 26*b* facing a corresponding first internal electrode layer 16*a*, and a second extended electrode portion 28*b* located on one end of second internal electrode layer 16*b* and extending from second counter electrode portion 26*b* to second end surface 12*f* of multilayer body 12. Second extended electrode portion 28*b* includes an end extended to the surface of second end surface 12*f* and exposed from multilayer body 12.

A shape of second counter electrode part 26*b* of each second internal electrode layer 16*b* is preferably, but not particularly limited to, a rectangular or substantially rectangular shape as viewed from above. Corners as viewed from above may be rounded or chamfered (tapered). Alternatively, a tapered shape in which an inclination is provided in either direction as viewed from above may be used.

A shape of second extended electrode portion 28b of each second internal electrode layer 16b is preferably, but not particularly limited to, a rectangular or substantially rectangular shape as viewed from above, for example. Corners as viewed from above may be rounded or chamfered (tapered). Alternatively, a tapered shape in which an inclination is provided in either direction as viewed from above may be used.

A width of second counter electrode portion 26b of each second internal electrode layer 16b and a width of second extended electrode portion 28b of each second internal electrode layer 16b may be the same or substantially the same, or either one of the widths may be smaller than the other.

First internal electrode layers 16a and second internal electrode layers 16b may be made of an appropriate conductive material, for example, a metal such as Ni, Cu, Ag, Pd, or Au, or an alloy such as an Ag—Pd alloy including at least one of the metals.

A thickness of each of internal electrode layers 16, that is, respective thicknesses of first internal electrode layer 16a and second internal electrode layer 16b is preferably, for example, greater than or equal to about 0.2 μm and less than or equal to about 2.0 μm.

Further, the number of first internal electrode layers 16a and second internal electrode layers 16b is preferably, for example, greater than or equal to 10 and less than or equal to 700 in total.

As illustrated in FIGS. 1 to 3, external electrode 30 is disposed adjacent to first end surface 12e and second end surface 12f of multilayer body 12.

External electrode 30 includes a first external electrode 30a and a second external electrode 30b.

First external electrode 30a is connected to first internal electrode layers 16a and is disposed on at least the surface of first end surface 12e. Further, first external electrode 30a extends from first end surface 12e of multilayer body 12 so as to be disposed on a portion of first principal surface 12a and a portion of second principal surface 12b, and a portion of first lateral surface 12c and a portion of second lateral surface 12d. In this case, first external electrode 30a is electrically connected to first extended electrode portions 28a of first internal electrode layers 16a.

Second external electrode 30b is connected to second internal electrode layers 16b and is disposed on at least the surface of second end surface 12f. Further, second external electrode 30b extends from second end surface 12f so as to be disposed on a portion of first principal surface 12a and a portion of second principal surface 12b, and a portion of first lateral surface 12c and a portion of second lateral surface 12d. In this case, second external electrode 30b is electrically connected to second extended electrode portions 28b of second internal electrode layers 16b.

External electrode 30 includes an underlying electrode layer 32 including a metal component and a plating layer 34 disposed on underlying electrode layer 32.

First external electrode 30a includes a first underlying electrode layer 32a including a metal component, and a first plating layer 34a disposed on first underlying electrode layer 32a.

Second external electrode 30b includes a second underlying electrode layer 32b including a metal component and a second plating layer 34b disposed on second underlying electrode layer 32b.

A conductive resin layer 36 including a metal component and a thermosetting resin component may be disposed between underlying electrode layer 32 and plating layer 34. This can produce advantageous effects of not only electrode separation by a fatty acid to be described later but also stress absorption by the resin component included in conductive resin layer 36 and sacrificial fracture by the resin component included in the conductive resin layer even when an extremely large impact upon dropping or an impact caused by thermal cycles is applied to multilayer ceramic capacitor 10, and the advantageous effects of preferred embodiments of the present invention can be further improved.

In multilayer body 12, first counter electrode portion 26a of each first internal electrode layer 16a and second counter electrode portion 26b of each second internal electrode layer 16b face each other with a corresponding ceramic layer 14 interposed between first counter electrode portion 26a and second counter electrode portion 26b to generate capacitance. Therefore, capacitance can be obtained between first external electrode 30a to which first internal electrode layers 16a are connected and second external electrode 30b to which second internal electrode layers 16b are connected, which produce characteristics of a capacitor.

Figure 6A:
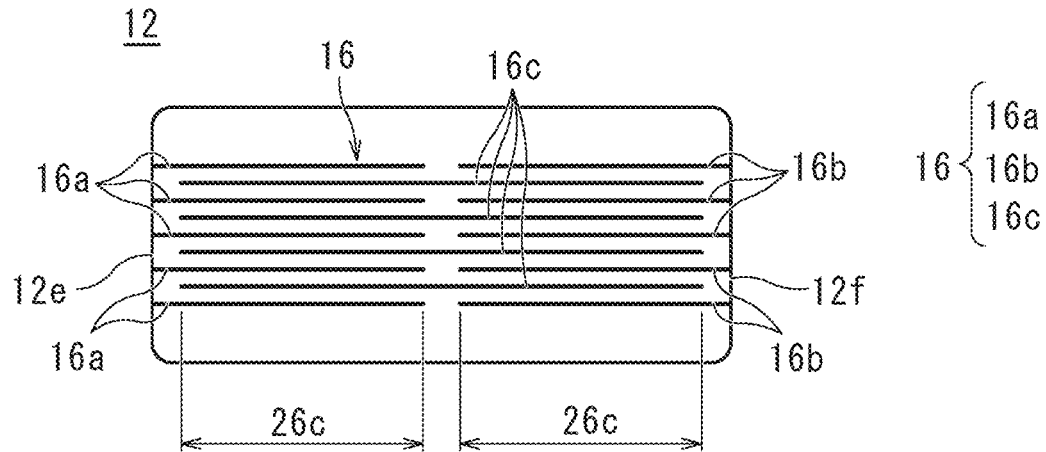
FIG. 6A is a cross-sectional view, taken along line II-II in FIG. 1, of a structure where a counter electrode portion of an internal electrode layer of a multilayer ceramic capacitor according to a preferred embodiment of the present invention is divided into two.
Figure 6B:
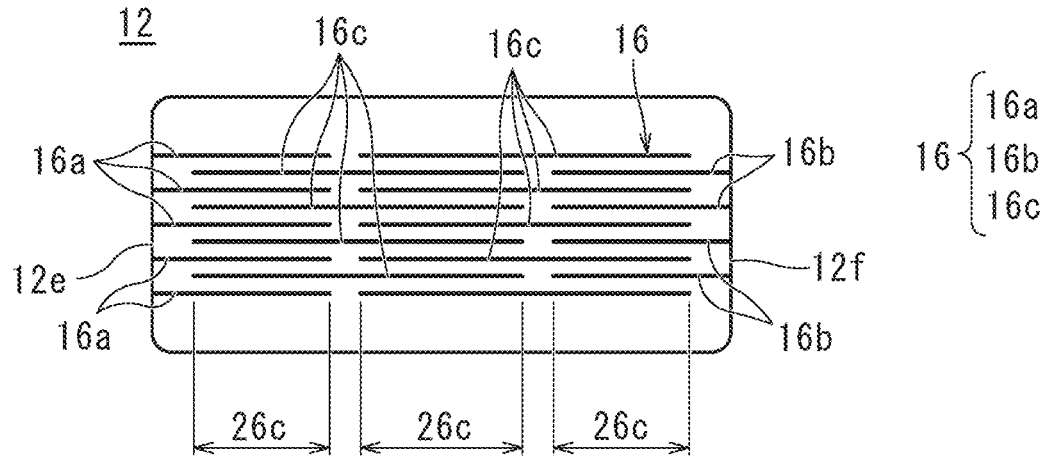
FIG. 6B is a cross-sectional view, taken along line II-II in FIG. 1, of a structure where the counter electrode portion of an internal electrode layer of a multilayer ceramic capacitor according to a preferred embodiment of the present invention is divided into three.
Figure 6C:
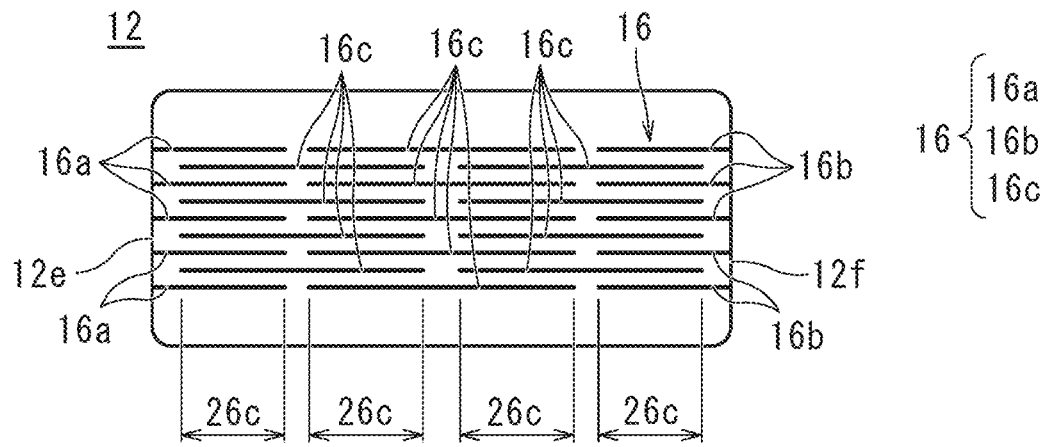
FIG. 6C is a cross-sectional view, taken along line II-II in FIG. 1, of a structure where the counter electrode portion of an internal electrode layer of a multilayer ceramic capacitor according to a preferred embodiment of the present invention is divided into four.

As illustrated in FIGS. 6A to 6C, multilayer body 12 illustrated in FIG. 1 may have a structure where, in addition to first internal electrode layers 16a and second internal electrode layers 16b, floating internal electrode layers 16c that are not extended to either first end surface 12e or second end surface 12f are provided, and the existence of floating internal electrode layers 16c allows a counter electrode portion 26c to be divided into a plurality of portions. For example, FIG. 6A illustrates a double structure, FIG. 6B illustrates a triple structure, and FIG. 6C illustrates a quadruple structure, and further, a quadruple or more structure may be provided. As described above, with a structure where counter electrode portion 26c is divided into a plurality of portions, a plurality of capacitor components are provided between internal electrode layers 16a, 16b, 16c facing each other, and the capacitor components are connected in series. This makes a voltage applied to each capacitor component lower and thus enables an increase in withstand voltage of multilayer ceramic capacitor 10.

Underlying electrode layer 32 includes first underlying electrode layer 32a and second underlying electrode layer 32b.

First underlying electrode layer 32a is connected to first internal electrode layers 16a and is disposed on the surface of first end surface 12e. Further, first underlying electrode layer 32a extends from first end surface 12e so as to be disposed on a portion of first principal surface 12a and a portion of second principal surface 12b, and a portion of first lateral surface 12c and a portion of second lateral surface 12d. In this case, first underlying electrode layer 32a is electrically connected to first extended electrode portions 28a of first internal electrode layers 16a.

Second underlying electrode layer 32b is connected to second internal electrode layers 16b and is disposed on the surface of second end surface 12f. Further, second underlying electrode layer 32b extends from second end surface 12f so as to be disposed on a portion of first principal surface 12a and a portion of second principal surface 12b, and a portion of first lateral surface 12c and a portion of second lateral surface 12d. In this case, second underlying electrode layer 32b is electrically connected to second extended electrode portions 28b of second internal electrode layers 16b.

Underlying electrode layer 32 includes a metal component. Further, underlying electrode layer 32 preferably includes a glass component or a ceramic component. This allows an increase in adhesion between multilayer body 12 and underlying electrode layer 32. Underlying electrode layer 32 may include both a glass component and a ceramic component.

The metal component included in underlying electrode layer 32 includes, for example, at least one selected from among Cu, Ni, Ag, Pd, an Ag—Pd alloy, Au, and the like. The glass component included in underlying electrode layer 32 includes, for example, at least one selected from among B, Si, Ba, Mg, Al, Li, and the like. Further, as the ceramic component, a ceramic material the same type as ceramic layers 14 may be used, or a different type of ceramic material may be used. The ceramic component includes, for example, at least one selected from among $BaTiO_3$, $CaTiO_3$, $(Ba, Ca)TiO_3$, $SrTiO_3$, $CaZrO_3$, and the like.

Underlying electrode layer 32 include a plurality of layers.

In a case where underlying electrode layer 32 includes a metal component and a glass component, underlying electrode layer 32 is obtained by applying a conductive paste including a glass component and a metal component to multilayer body 12 and baking the paste, and may be fired together with internal electrode layers 16 and ceramic layers 14, or may be baked after internal electrode layers 16 and ceramic layers 14 are fired. In a case where underlying electrode layer 32 is fired together with internal electrode layers 16 and ceramic layers 14, underlying electrode layer 32 is preferably formed with a ceramic material, instead of a glass component added to underlying electrode layer 32.

It is preferable that a thickness of a center in height direction x of first underlying electrode layer 32a located on first end surface 12e in length direction z from first end surface 12e to second end surface 12f is greater than or equal to about 2 μm and less than or equal to about 220 μm, for example.

It is preferable that a thickness of a center in height direction x of second underlying electrode layer 32b located on second end surface 12f in length direction z from first end surface 12e to second end surface 12f is greater than or equal to about 2 μm and less than or equal to about 220 μm, for example.

It is preferable that a thickness of a center in length direction z of first underlying electrode layer 32a located on a portion of first principal surface 12a and a portion of second principal surface 12b in height direction x from first principal surface 12a to second principal surface 12b, length direction z being from first end surface 12e to second end surface 12f, is greater than or equal to about 4 μm and less than or equal to about 15 μm, for example.

It is preferable that a thickness of a center in length direction z of second underlying electrode layer 32b located on a portion of first principal surface 12a and a portion of second principal surface 12b in height direction x from first principal surface 12a to second principal surface 12b, length direction z being from first end surface 12e to second end surface 12f, is greater than or equal to about 4 μm and less than or equal to about 15 μm, for example.

It is preferable that a thickness of a center in length direction z of first underlying electrode layer 32a located on a portion of f surface 12c and a portion of second lateral surface 12d in width direction y from first lateral surface 12c to second lateral surface 12d, length direction z being from first end surface 12e to second end surface 12f, is greater than or equal to about 4 μm and less than or equal to about 15 μm, for example.

It is preferable that a thickness of a center in length direction z of second underlying electrode layer 32b located on a portion of first lateral surface 12c and a portion of second lateral surface 12d in width direction y from first lateral surface 12c to second lateral surface 12d, length direction z being from first end surface 12e to second end surface 12f, is greater than or equal to about 4 μm and less than or equal to about 15 μm, for example.

A fatty acid 40 is provided on at least the surface of underlying electrode layer 32. More specifically, fatty acid 40 is provided on at least the surface of first underlying electrode layer 32a and the surface of second underlying electrode layer 32b. This causes a carboxy group of the fatty acid to be ionized and adsorbed to underlying electrode layer 32 by an ion binding force, and plating of plating layer 34 provided on underlying electrode layer 32 is reduced or prevented from being deposited at the adsorption portion, thus enabling a reduction in bonding area between underlying electrode layer 32 and plating layer 34. This causes a reduction in adhesion between underlying electrode layer 32 and plating layer 34, so that an advantageous effect of making underlying electrode layer 32 and plating layer 34 provided on underlying electrode layer 32 easy to separate from each other is exhibited. Therefore, when an impact upon dropping or an impact caused by thermal cycles is applied to multilayer ceramic capacitor 10, underlying electrode layer 32 and plating layer 34 can be stably separated, and stress can be released accordingly. As a result, multilayer body 12 of multilayer ceramic capacitor 10 can be reduced or prevented from cracking. According to the present preferred embodiment, it is possible to improve the degree of freedom in design of multilayer body 12 by the thickness of the thermosetting resin layer as disclosed in Japanese Patent Laying-Open No. H11-162771, so that it is possible to make the capacitance larger as the multilayer ceramic capacitor.

Here, a state where fatty acid 40 is provided on the surface of underlying electrode layer 32 specifically means a state where fatty acid 40 is scattered over the surface of underlying electrode layer 32. Each fatty acid 40 scattered over the surface of underlying electrode layer 32 is provided as an independent layer.

A ratio of an area of fatty acid 40 to an area of the surface of underlying electrode layer 32 is preferably, for example, greater than or equal to about 40% and less than or equal to about 70% on each surface of external electrode 30. This makes it possible to make adhesion between underlying electrode layer 32 and plating layer 34 high enough while making underlying electrode layer 32 and plating layer 34 are easy to separate from each other.

The ratio of the area of fatty acid 40 to the area of the surface of underlying electrode layer 32 can be calculated using, for example, a time-of-flight secondary ion mass spectrometer (TOF-SIMS). Specifically, the ratio is calculated as follows.

Figure 7:
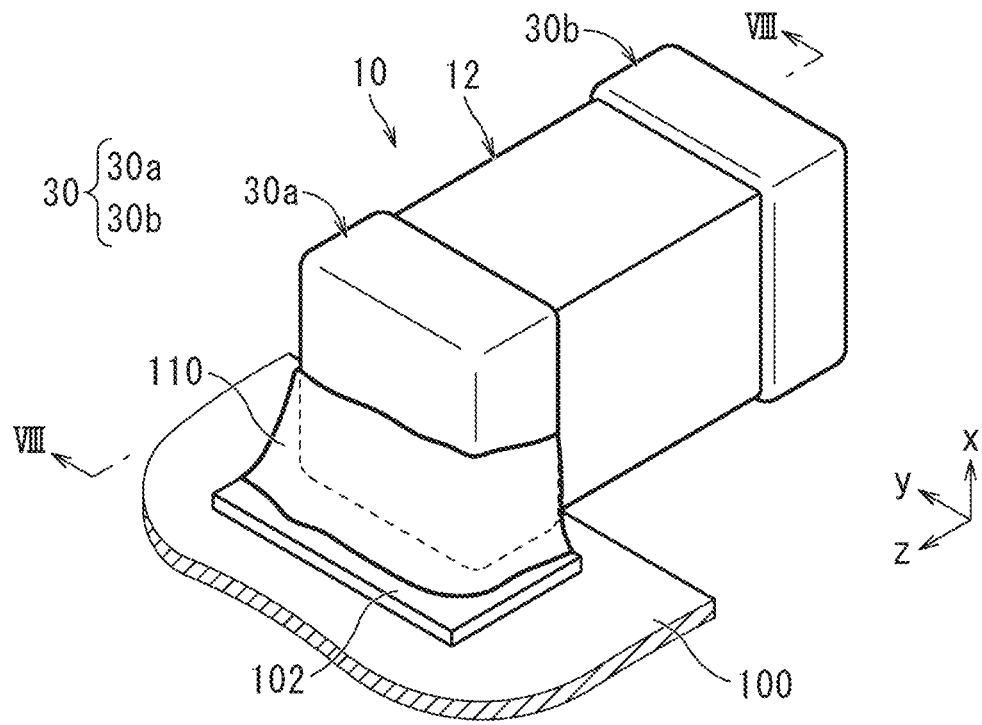
FIG. 7 is a perspective view of a main portion for describing a method for detecting a fatty acid included in a multilayer ceramic capacitor as a multilayer ceramic electronic component according to a preferred embodiment of the present invention.
Figure 8:
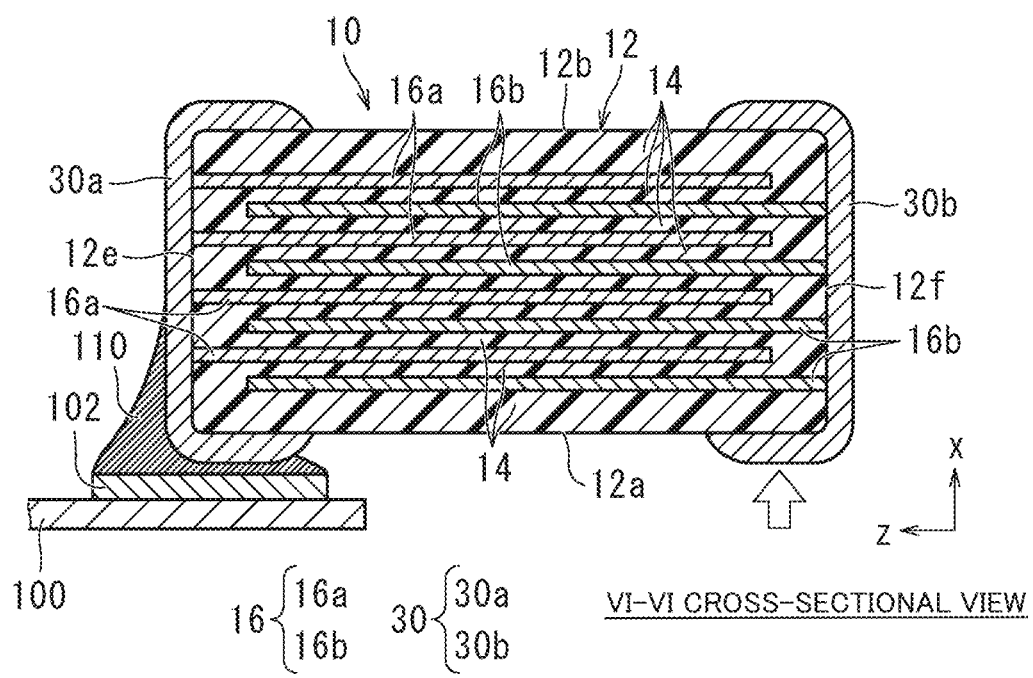
FIG. 8 is a cross-sectional view taken along line VIII-VIII in FIG. 7.

That is, first, as illustrated in FIGS. 7 and 8, only first external electrode 30a of multilayer ceramic capacitor 10 is mounted on a mounting substrate 100 using solder 110 to cause second external electrode 30b to float in the air. Next, second external electrode 30b floating in the air is pushed in the height direction from a lower surface to cause underlying electrode layer 32 and plating layer 34 to separate from each other at first external electrode 30a on the mounting side on mounting substrate 100. Note that second external electrode 30b may be mounted on mounting substrate 100 to cause first external electrode 30a to float in the air.

A separated lateral surface of underlying electrode layer 32, that is, underlying electrode layer 32 mounted on a land electrode 102 of mounting substrate 100, is entirely or substantially entirely irradiated with primary ions ($Bi_3^{++}$) at an accelerating voltage of about 25 kV to check for detection of secondary ions corresponding to fatty acid 40. Here, examples of the secondary ions corresponding to fatty acid 40 include $C_{16}H_{29}O_2^-$ for palmitic acid and $C_{18}H_{33}O_2^-$ for oleic acid. Then, a mapping image of the secondary ions is acquired, and an area ratio of a region where secondary ions corresponding to fatty acid 40 have been detected is calculated through binarization by, for example, image analysis software. As the image analysis software, for example, imageJ or the like may be used.

Further, as an example of a method for detecting a fatty acid, a time-of-flight secondary ion mass spectrometer (TOF-SIMS) is used.

That is, first, as illustrated in FIGS. 7 and 8, only first external electrode 30a of multilayer ceramic capacitor 10 is mounted on mounting substrate 100 using solder 110 to cause second external electrode 30b to float in the air. Next, second external electrode 30b floating in the air is pushed in the height direction from the lower surface to cause underlying electrode layer 32 and plating layer 34 to separate from each other at first external electrode 30a on the mounting side on mounting substrate 100. Note that second external electrode 30b may be mounted on mounting substrate 100 to cause first external electrode 30a to float in the air.

Then, the surface of exposed underlying electrode layer 32 mounted on land electrode 102 is entirely or substantially entirely irradiated with primary ions ($Bi_3^{++}$) at an accelerating voltage of about 25 kV to check for detection of secondary ions corresponding to fatty acid 40. Here, examples of the secondary ions corresponding to fatty acid 40 include $C_{16}H_{29}O_2^-$ for palmitic acid and $C_{18}H_{33}O_2^-$ for oleic acid. Further, when the secondary ions corresponding to fatty acid 40 have been detected, it is determined that fatty acid 40 is present.

Figure 9:
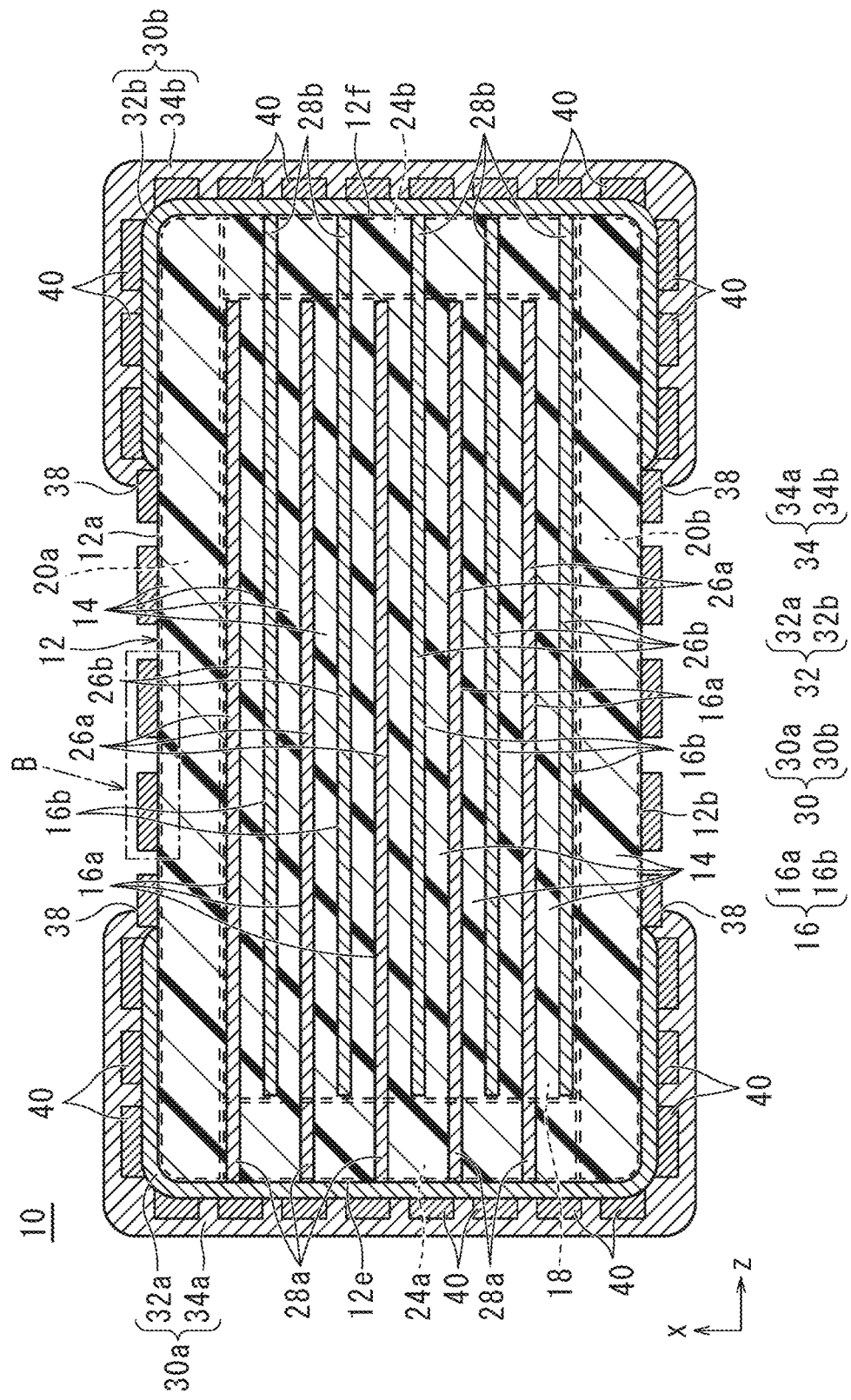
FIG. 9 is a cross-sectional view of a multilayer ceramic capacitor as an example of a multilayer ceramic electronic component according to a modification of a preferred embodiment of the present invention and corresponds to FIG. 2.

As illustrated in FIG. 9, fatty acid 40 is also preferably provided on the surface of multilayer body 12 between first external electrode 30a and second external electrode 30b. More specifically, it is preferable that a tip 38 of plating layer 34 located on a surface of at least one of first principal surface 12a and second principal surface 12b, or first lateral surface 12c and second lateral surface 12d is provided on the surface of multilayer body 12 so as to be in contact with the surface of fatty acid 40, and fatty acid 40 is provided on the surface of multilayer body 12 between first external electrode 30a and second external electrode 30b. This can define or function as a cushion between multilayer body 12 and plating layer 34 to form a non-contact region between plating layer 34 and the surface of multilayer body 12 and bring tip 38 of plating layer 34 out of contact with the surface of multilayer body 12, so that it is possible to make separation easier. This allows underlying electrode layer 32 and plating layer 34 to easily separate from each other with higher stability.

Fatty acid 40 is not limited to a specific acid, and the advantageous effect of separation between underlying electrode layer 32 and plating layer 34 can be obtained regardless of whether fatty acid 40 is an acid having a small number of carbon atoms per molecule (in this example, six or less carbon atoms) such as a butyric acid, a valeric acid, or caproic acid or fatty acid 40 is an acid having a large number of carbon atoms per molecule (in this example, 26 or more carbon atoms) such as a cerotic acid, a montanic acid, or a melissic acid. On the other hand, the smaller the number of carbon atoms, the shorter the length of the molecule, so that the thickness of fatty acid 40 decreases, and it is thus difficult to obtain the separation effect. Further, as the number of carbon atoms increases, the molecules of the fatty acid are entangled with each other, so that the film tends to be continuous, and it is thus difficult to provide the scattered state as illustrated in FIG. 2 at the time of formation of fatty acid 40. In order to make binding stability between underlying electrode layer 32 and plating layer 34 high enough while obtaining at least a certain degree of separation effect, for example, a fatty acid having about 15 carbon atoms per molecule such as a palmitic acid, an oleic acid, a stearic acid, or a myristic acid is particularly preferable.

A relative intensity of secondary ions on underlying electrode layer 32 or on the surface of multilayer body 12 between first external electrode 30a and second external electrode 30b is preferably, for example, greater than or equal to about $8.07 \times 10^{-5}$ and less than or equal to about $1.27 \times 10^{-3}$. This improves the advantageous effects of reducing or preventing adhesion between underlying electrode layer 32 and plating layer 34 by fatty acid 40 and allows separation to easily occur, so that an advantageous effect of increasing a substrate bending strength can be obtained.

As a relative intensity of secondary ions derived from fatty acid 40 on the surface of underlying electrode layer 32, intensity derived from fatty acid 40 is measured.

As a relative intensity of secondary ions on the surface of multilayer body 12 between first external electrode 30a and second external electrode 30b, intensity derived from fatty acid 40 is measured.

The relative intensity of secondary ions on the surface of underlying electrode layer 32 can be measured by, for example, the following method.

That is, first, as illustrated in FIGS. 7 and 8, only first external electrode 30a of the multilayer ceramic capacitor is mounted on mounting substrate 100 using solder 110 to cause second external electrode 30b to float in the air. Next, second external electrode 30b floating in the air is pushed in the height direction from the lower surface to cause underlying electrode layer 32 and plating layer 34 to separate from each other at first external electrode 30a on the mounting side on mounting substrate 100. Second external electrode 30b may be mounted on mounting substrate 100 to cause first external electrode 30a to float in the air.

Then, the surface of exposed underlying electrode layer 32 mounted on land electrode 102 is entirely or substantially entirely irradiated with primary ions ($Bi_3^{++}$) at an accelerating voltage of about 25 kV to check for detection of secondary ions corresponding to the fatty acid. Here, examples of the secondary ions corresponding to the fatty acid include $C_{16}H_{29}O_2^-$ for palmitic acid and $C_{18}H_{33}O_2^-$ for oleic acid. Here, the relative intensity is obtained from the intensity of secondary ions derived from the fatty acid relative to the total intensity of detected secondary ions.

The relative intensity of secondary ions on the surface of multilayer body 12 between first external electrode 30a and second external electrode 30b can be measured by, for example, the following method.

That is, first, primary ions ($Bi_3^{++}$) are emitted at an accelerating voltage of about 25 kV to four points of the center of the first principal surface, the center of the second principal surface, the center of the first lateral surface, and the center of the second lateral surface of the multilayer ceramic capacitor to check for detection of secondary ions corresponding to the fatty acid. Here, examples of the secondary ions corresponding to the fatty acid include $C_{16}H_{29}O_2^-$ for palmitic acid and $C_{18}H_{33}O_2^-$ for oleic acid. Here, the relative intensity is obtained from the intensity of secondary ions derived from the fatty acid relative to the total intensity of detected secondary ions. Finally, an average value of the four points is taken as the relative intensity of secondary ions on the surface of multilayer body 12.

An amount of carbon component on the surface of the underlying electrode layer is preferably, for example, greater than or equal to about 74 atom % and less than or equal to about 82 atom %. Similarly, an amount of carbon component on the surface of multilayer body 12 between first external electrode 30a and second external electrode 30b is preferably, for example, greater than or equal to about 74 atom % and less than or equal to about 82 atom %. This allows an exposure amount of a metal portion bonded to plating layer 34 to be sufficiently reduced, and allows a reduction in adhesion region between underlying electrode layer 32 and plating layer 34. This reduces adhesion between underlying electrode layer 32 and plating layer 34, so that an advantageous effect of making underlying electrode layer 32 and plating layer 34 on underlying electrode layer 32 easy to separate from each other is sufficiently provided.

The amount of carbon component derived from fatty acid 40 on the surface of underlying electrode layer 32 can be measured by, for example, the following method.

That is, X-ray photoelectron spectroscopy (XPS) is used for quantification. Then, as illustrated in FIGS. 7 and 8, only first external electrode 30a of multilayer ceramic capacitor 10 is mounted on mounting substrate 100 using solder 110 to cause second external electrode 30b to float in the air. Next, second external electrode 30b floating in the air is pushed in the height direction from the lower surface to cause underlying electrode layer 32 and plating layer 34 to separate from each other at one electrode 30 on the mounting side on mounting substrate 100. Second external electrode 30b may be mounted on mounting substrate 100 to cause first external electrode 30a to float in the air.

Then, the surface of exposed underlying electrode layer 32 mounted on land electrode 102 is irradiated with X rays. At this time, an accelerating voltage of thermo electrons is set to about 15 kV. After qualitative analysis of all elements is performed by wide-scan, it is possible to quantify an abundance ratio (atom %) of all the elements by narrow-scan and calculate the amount of carbon component derived from fatty acid 40 on the surface of underlying electrode layer 32.

The amount of carbon component derived from fatty acid 40 on the surface of multilayer body 12 between first external electrode 30a and second external electrode 30b can be measured by, for example, the following method.

That is, X-ray photoelectron spectroscopy (XPS) is used for quantification. Then, X rays accelerated by about 15 kV are emitted to four points of the center of first principal surface 10a, the center of second principal surface 12b, the center of first lateral surface 12c, and the center of second lateral surface 12d of multilayer ceramic capacitor 10. After qualitative analysis of all elements is performed by wide-scan, it is possible to quantify an abundance ratio (atom %) of all the elements by narrow-scan and calculate the amount of carbon component derived from fatty acid 40 on underlying electrode layer 32 or on the surface of multilayer body 12 between first external electrode 30a and second external electrode 30b. Finally, an average value of the four points is taken as the amount of carbon component on the surface of multilayer body 12.

A thickness of each layer of fatty acid scattered over the surface of underlying electrode layer 32 and the surface of multilayer body 12 is preferably, for example, greater than or equal to about 10 nm and less than or equal to about 500 nm. The thickness is more preferably, for example, greater than or equal to about 50 nm and less than or equal to about 200 nm. The thickness is still more preferably, for example, greater than or equal to about 60 nm and less than or equal to about 100 nm.

The thickness of fatty acid 40 is measured by scanning electron microscope (SEM) image analysis of a cross section of multilayer ceramic capacitor 10.

Figure 10A:
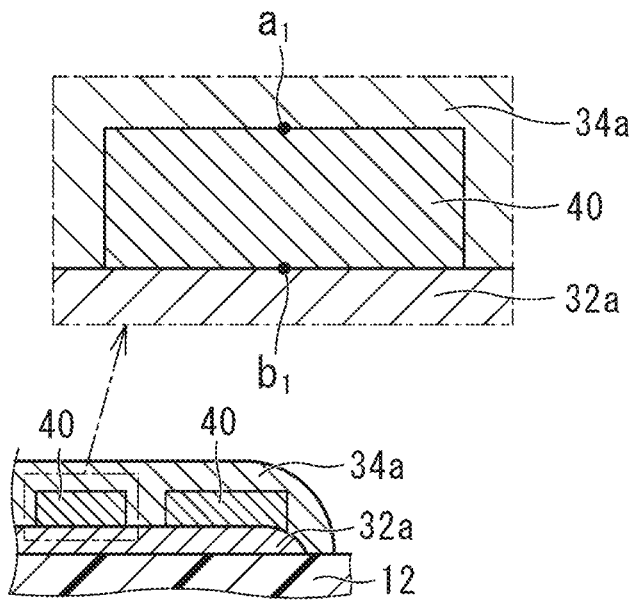
FIG. 10A is a schematic cross-sectional view for describing a method for measuring a thickness of a fatty acid located on an underlying electrode layer.

Specifically, the thickness of fatty acid 40 located on underlying electrode layer 32 is measured as follows. FIG. 10A is a schematic cross-sectional view illustrating an example of a method for measuring the thickness of the fatty acid located on the underlying electrode layer.

That is, as illustrated in FIG. 10A, the four points of the center of either of external electrodes 30 located on first principal surface 12a of multilayer ceramic capacitor 10, the center of either of external electrodes 30 located on second principal surface 12b, the center of either of external electrodes 30 located on first lateral surface 12c, and the center of either of external electrodes 30 located on second lateral surface 12d are cut at an angle of about 45 degrees relative to the surface to be measured using a focused ion beam (FIB) device. After processing to a depth at which a cross section between underlying electrode layer 32 and plating layer 34 can be confirmed, an SEM image is acquired. A secondary electron image (for example, about 5 kV) is acquired at a magnification of about 10,000 times. Note that FIG. 10A illustrates the center of first external electrode 30a located on first principal surface 12a. Here, for fatty acid 40 provided at an interface between underlying electrode layer 32 and plating layer 34 at each of the four points, a point $a_1$ at an interface between plating layer 34 and fatty acid 40 and a point $b_1$ at an interface between underlying electrode layer 32 and fatty acid 40 are taken, and the thickness of fatty acid 40 is measured by measuring a distance between the two points in the thickness direction. Finally, an average value is taken as the thickness of fatty acid 40.

Figure 10B:
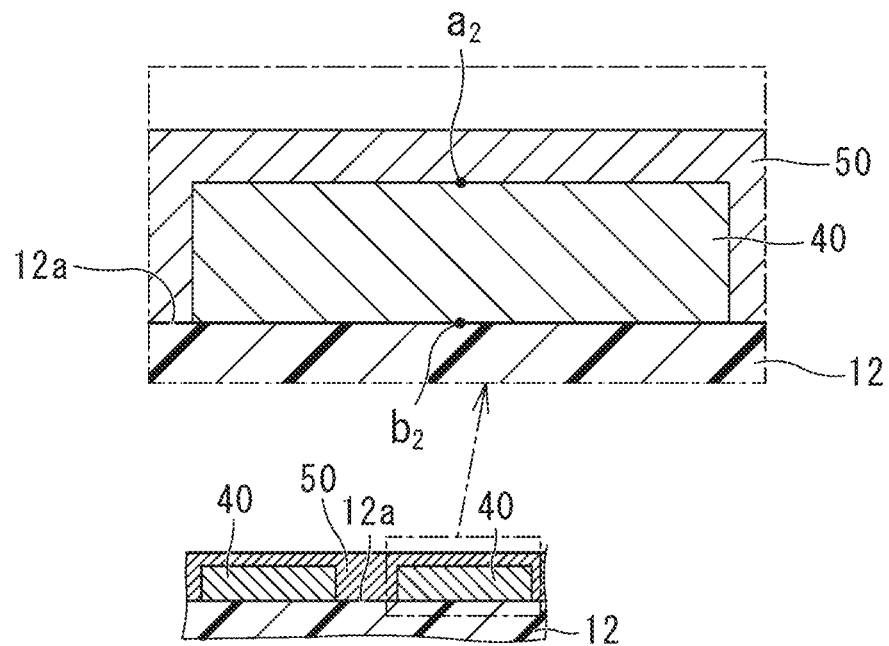
FIG. 10B is a schematic cross-sectional view for describing a method for measuring a thickness of a fatty acid on a surface of a multilayer body.

Next, the thickness of fatty acid 40 on the surface of multilayer body 12 is specifically measured as follows. FIG. 10B is a schematic cross-sectional view illustrating an example of a method for measuring the thickness of the fatty acid on the surface of the multilayer body.

That is, as illustrated in FIG. 10B, the entire or substantially the entire surface of multilayer ceramic capacitor 10 is subjected to Au coating using a sputtering device to form an Au coating layer 50.

First, after sputtering is performed at a discharge current of about 30 mA for about 5 minutes, cutting is performed at an angle of about 45 degrees relative to the surface to be measured using a focused ion beam (FIB) device at four points of the center of first principal surface 10a, the center of second principal surface 12b, the center of first lateral surface 12c, and the center of second lateral surface 12d of multilayer ceramic capacitor 10. After processing is performed to a depth at which a cross section between Au coating layer 50 subjected to sputtering and the surface of multilayer body 12 can be confirmed, an SEM image is acquired. A secondary electron image (for example, about 5 kV) is acquired at a magnification of about 10,000 times. FIG. 10B illustrates the center of first principal surface 12a of multilayer body 12. Here, the thickness of fatty acid 40 is measured by taking a point $a_2$ at an interface between Au coating layer 50 and fatty acid 40 and a point $b_2$ at an interface between the surface of multilayer body 12 and fatty acid 40 from the four points and measuring a distance between the two points in the thickness direction. Finally, an average value is taken as the thickness of fatty acid 40.

Further, the amount of carbon component derived from fatty acid 40 disposed on underlying electrode layer 32 may be different from the amount of carbon component derived from fatty acid 40 disposed on the surface of multilayer body 12 between first external electrode 30*a* and second external electrode 30*b*. In this case, the amount of carbon component derived from fatty acid 40 disposed on the underlying electrode layer 32 is preferably larger than the amount of carbon component derived from fatty acid 40 disposed on the surface of multilayer body 12 between first external electrode 30*a* and second external electrode 30*b*. This easily causes underlying electrode layer 32 and plating layer 34 provided on underlying electrode layer 32 to separate from each other.

Similarly, the relative intensity of secondary ions derived from fatty acid 40 disposed on underlying electrode layer 32 may be different from the relative intensity of secondary ions derived from fatty acid 40 disposed on the surface of multilayer body 12 between first external electrode 30*a* and second external electrode 30*b*. In this case, the relative intensity of secondary ions derived from fatty acid 40 disposed on underlying electrode layer 32 is preferably larger than the relative intensity of secondary ions derived from fatty acid 40 on the surface of multilayer body 12 between first external electrode 30*a* and second external electrode 30*b*.

Figure 11:
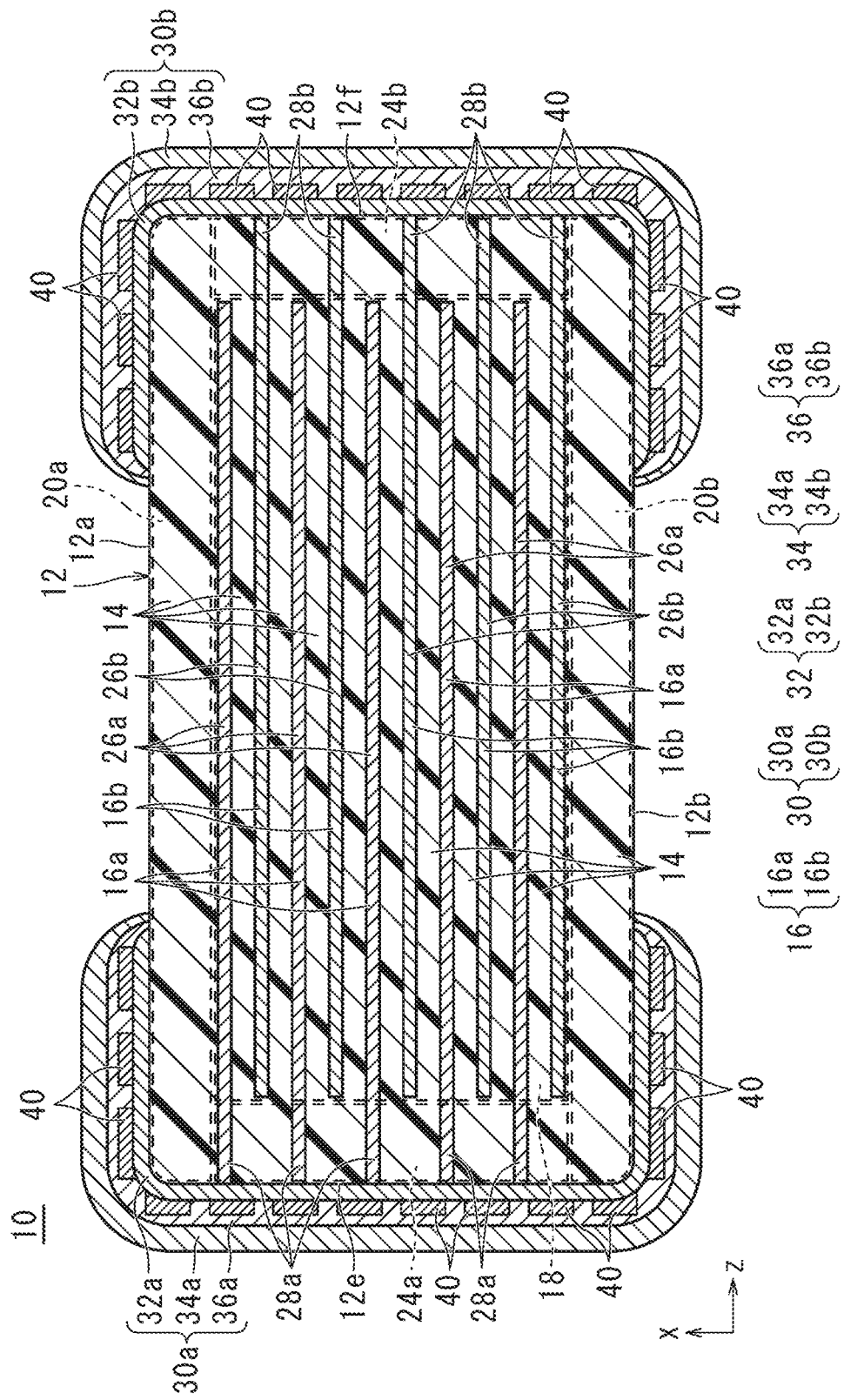
FIG. 11 is a cross-sectional view of a multilayer ceramic capacitor as an example of a multilayer ceramic electronic component according to another modification of a preferred embodiment of the present invention and corresponds to FIG. 2.

Further, as illustrated in FIG. 11, conductive resin layer 36 including a resin component and a metal component disposed on underlying electrode layer 32 may be provided on underlying electrode layer 32. This can produce advantageous effects of not only electrode separation by fatty acid 40 but also stress absorption by the resin component contained in conductive resin layer 36 and sacrificial fracture by the resin component included in conductive resin layer 36 even when an extremely large impact upon dropping or an impact caused by thermal cycles is applied to multilayer ceramic capacitor 10, and the advantageous effects of preferred embodiments of the present invention can be further improved.

Conductive resin layer 36 includes a first conductive resin layer 36*a* and a second conductive resin layer 36*b*.

It is preferable that first conductive resin layer 36*a* is disposed on first underlying electrode layer 32*a* so as to cover first underlying electrode layer 32*a*, and ends of first conductive resin layer 36*a* are in contact with multilayer body 12.

It is preferable that second conductive resin layer 36*b* is disposed on second underlying electrode layer 32*b* so as to cover second underlying electrode layer 32*b*, and ends of second conductive resin layer 36*b* are in contact with multilayer body 12.

Conductive resin layer 36 includes, for example, a thermosetting resin as a resin component, so that conductive resin layer 36 is more flexible than underlying electrode layer 32 made of, for example, a plating film or a product obtained by firing a metal component and a glass component. Accordingly, even when bending stress is applied to the mounting substrate to cause a physical impact or an impact caused by thermal cycles to be applied to multilayer ceramic capacitor 10, conductive resin layer 36 can define and function as a buffer layer to reduce or prevent multilayer ceramic capacitor 10 from cracking.

As the thermosetting resin of conductive resin layer 36, for example, one of various known thermosetting resins such as an epoxy resin, a phenoxy resin, a phenol resin, a urethane resin, a silicone resin, or a polyimide resin may be used. Among them, the epoxy resin that is excellent in heat resistance, moisture resistance, adhesion, and the like is one of the preferable resins.

Further, conductive resin layer 36 preferably includes a setting agent together with the thermosetting resin. In a case where the epoxy resin is used as a base resin, one of various known compounds such as phenol-based, amine-based, acid anhydride-based, imidazole-based, active ester-based, and amide-imide-based compounds may be used as the setting agent of the epoxy resin.

The metal component included in conductive resin layer 36 is preferably, for example, a metal filler, and preferably includes Ag. Ag alone may be used, or an alloy including Ag or metal powder whose surface coated with Ag may be used, for example. When the metal powder whose surface coated with Ag is used, for example, Cu, Ni, Sn, Bi, or an alloy powder thereof is preferably used as the metal powder. The reason why Ag is used as the metal filler is that Ag has the lowest specific resistance among metals and is thus suitable for an electrode material, and Ag is not oxidized and has high weather resistance because Ag is a noble metal. It is further possible to make the cost of metal of a base member lower while maintaining the properties of Ag described above.

There is no particular limitation on the shape of the metal filler included in conductive resin layer 36. The metal filler may have, for example, a spherical shape, a flat shape, or the like. Further, spherical metal powder and flat metal powder may be mixed.

There is no particular limitation on an average particle diameter of the metal filler included in conductive resin layer 36. The average particle diameter of the metal filler may be greater than or equal to about 0.3 μm and less than or equal to about 10 μm, for example.

The average particle diameter of the metal filler contained in conductive resin layer 36 can be calculated using, for example, a laser diffraction particle size measurement method based on ISO 13320 regardless of the shape of the filler.

The metal filler included in conductive resin layer 36 is mainly responsible for conductivity of conductive resin layer 36. Specifically, the metal fillers come into contact with each other to provide a conductive path inside conductive resin layer 36.

It is preferable that the thickness of conductive resin layer 36 is greater than or equal to about 10 μm and less than or equal to about 200 μm, for example.

Even in a case where conductive resin layer 36 is provided on underlying electrode layer 32, fatty acid 40 may be provided on the surface of multilayer body 12 between first external electrode 30*a* and second external electrode 30*b*. More specifically, tip 38 of plating layer 34 located on a surface of at least one of first principal surface 12*a* and second principal surface 12*b*, or first lateral surface 12*c* and second lateral surface 12*d* may be provided on the surface of multilayer body 12 so as to be in contact with the surface of fatty acid 40, and fatty acid 40 may be provided on the surface of multilayer body 12 between first external electrode 30*a* and second external electrode 30*b*.

Next, first plating layer 34*a* and second plating layer 34*b*, which are plating layer 34 disposed on underlying electrode layer 32, will be described with reference to FIGS. 2 and 3.

First plating layer 34*a* and second plating layer 34*b* include, for example, at least one selected from among Cu, Ni, Sn, Ag, Pd, an Ag—Pd alloy, Au, and the like.

First plating layer 34*a* covers first underlying electrode layer 32*a*.

Second plating layer 34*b* covers second underlying electrode layer 32*b*.

First plating layer 34a and second plating layer 34b may include a plurality of layers. In this case, plating layer 34 preferably has a two-layer structure of, for example, a lower plating layer (Ni plating layer) made of Ni plating on underlying electrode layer 32 and an upper plating layer (Sn plating layer) made of Sn plating on the lower plating layer.

That is, first plating layer 34a includes a first lower plating layer and a first upper plating layer located on the surface of the first lower plating layer.

Further, second plating layer 34b includes a second lower plating layer and a second upper plating layer located on the surface of the second lower plating layer.

The lower plating layer made of Ni plating is used to prevent underlying electrode layer 32 from being eroded by solder when multilayer ceramic capacitor 10 is mounted, and the upper plating layer made of Sn plating is used to improve wettability of solder when multilayer ceramic capacitor 10 is mounted so as to allow multilayer ceramic capacitor 10 to be easily mounted.

A thickness of each plating layer is preferably, for example, greater than or equal to about 2.0 μm and less than or equal to about 15.0 μm.

In a case where conductive resin layer 36 is provided on underlying electrode layer 32, plating layer 34 covers conductive resin layer 36.

A dimension in length direction z of multilayer ceramic capacitor 10 including multilayer body 12, first external electrode 30a, and second external electrode 30b is defined as an L dimension, a dimension in height direction x of multilayer ceramic capacitor 10 including multilayer body 12, first external electrode 30a, and second external electrode 30b is defined as a T dimension, and a dimension in width direction y of multilayer ceramic capacitor 10 including multilayer body 12, first external electrode 30a, and second external electrode 30b is defined as a W dimension.

As for the dimensions of multilayer ceramic capacitor 10, for example, L dimension in length direction z is greater than or equal to about 0.2 mm and less than or equal to about 10.0 mm, W dimension in width direction y is greater than or equal to about 0.1 mm and less than or equal to about 10.0 mm, and T dimension in the height direction x is greater than or equal to about 0.1 mm and less than or equal to about 10.0 mm. Further, the dimensions of multilayer ceramic capacitor 10 can be measured with, for example, a microscope.

In multilayer ceramic capacitor 10 illustrated in FIG. 1, fatty acid 40 is provided on at least the surface of first underlying electrode layer 32a and the surface of second underlying electrode layer 32b, so that the carboxy group of the fatty acid is ionized and adsorbed to underlying electrode layer 32 by the ion binding force, and plating of plating layer 34 provided on underlying electrode layer 32 is reduced or prevented from being deposited at the adsorption portion, thus enabling a reduction in bonding area between underlying electrode layer 32 and plating layer 34. This causes a reduction in adhesion between underlying electrode layer 32 and plating layer 34, so that an advantageous effect of making underlying electrode layer 32 and plating layer 34 on underlying electrode layer 32 easy to separate from each other is provided.

Therefore, when an impact upon dropping or an impact caused by thermal cycles is applied to multilayer ceramic capacitor 10, underlying electrode layer 32 and plating layer 34 can be stably separated, and stress can be released accordingly. As a result, multilayer body 12 of multilayer ceramic capacitor 10 can be reduced or prevented from cracking.

Further, in multilayer ceramic capacitor 10 illustrated in FIG. 1, a case where no conductive resin layer 36 is provided on external electrode 30 enables not only a reduction in cost but also an increase in the degree of freedom in design of multilayer body 12 by the thickness of conductive resin layer 36, so that it is possible to make the capacitance larger.

2. Method for Manufacturing Multilayer Ceramic Capacitor

Next, a non-limiting example of a for method manufacturing a multilayer ceramic capacitor will be described.

First, a dielectric sheet for a ceramic layer and a conductive paste for an internal electrode layer are prepared. The dielectric sheet and the conductive paste for the internal electrode layer include a binder and a solvent. The binder and the solvent may be known binder and solvent.

Then, the conductive paste for the internal electrode layer is printed on the dielectric sheet in a predetermined pattern by, for example, screen printing or gravure printing. As a result, a dielectric sheet on which a pattern of a first internal electrode layer is formed and a dielectric sheet on which a pattern of a second internal electrode layer is formed are prepared.

Further, regarding the dielectric sheet, a dielectric sheet for an outer layer on which the pattern of the internal electrode layer is not printed is also prepared.

Subsequently, a predetermined number of the dielectric sheets for the outer layer on which the pattern of the internal electrode layer is not printed are laminated to form a portion to be a second principal surface side outer layer portion on a second principal surface side. Then, the dielectric sheet on which the pattern of the first internal electrode layer is printed and the dielectric sheet on which the pattern of the second internal electrode layer is printed are sequentially laminated on the portion to be the second principal surface side outer layer portion to form a structure of the present preferred embodiment, thus forming a portion to be an inner layer portion. The predetermined number of dielectric sheets for the outer layer on which the pattern of the internal electrode layer is not printed are laminated on the portion to be the inner layer portion, thus forming a portion to be a first principal surface side outer layer part on a first principal surface side.

Next, the multilayer sheet is pressed in the laminating direction by pressing such as, for example, isostatic pressing to produce a multilayer block.

Then, a multilayer chip is cut out by cutting the multilayer block into a predetermined size. At this time, corners and edges of the multilayer chip may be rounded by barrel finishing or the like.

Next, the multilayer chip is fired to produce multilayer body 12. Depending on the materials of the ceramic layer as a dielectric and the internal electrode layer, a firing temperature is preferably, for example, greater than or equal to about 900° C. and less than or equal to about 1400° C.

Subsequently, a conductive paste to be an underlying electrode layer is applied to a first end surface and a second end surface of the multilayer body to form the underlying electrode layer. In a case where a baked layer is formed as the underlying electrode layer, a conductive paste including a glass component and a metal is applied by a method such as, for example, dipping, and then baking processing is performed to form the underlying electrode layer. A temperature of the baking processing is preferably, for example, greater than or equal to about 700° C. and less than or equal to about 950° C.

In a case where the underlying electrode layer is formed of a baked layer, the baked layer may include a ceramic component. In this case, a ceramic component may be included instead of a glass component, or both the ceramic component and the glass component may be included.

The ceramic component is preferably a ceramic material the same type as the multilayer body, for example. In a case where the baked layer includes a ceramic component, it is preferable that a conductive paste is applied to the multilayer chip before being fired, and the multilayer chip before being fired and the conductive paste applied to the multilayer chip before being fired are simultaneously baked (fired) to form a multilayer body on which the baked layer is formed. A temperature (firing temperature) of the baking processing is preferably, for example, greater than or equal to about 900° C. and less than or equal to about 1400° C.

Next, a layer over which a fatty acid is scattered is formed on the underlying electrode layer. In order to form the layer over which a fatty acid is scattered on the underlying electrode layer, a fatty acid is diluted with an organic solvent, and immersion in a solution is made. Specifically, for example, a solution obtained by diluting an oleic acid with IPA (2-propanol) is prepared. The multilayer body on which the underlying electrode layer is formed is put in a mesh basket and immersed in the solution for a predetermined time (for example, about 5 minutes). Subsequently, the mesh basket is taken out from the solution and set aside for drainage for a predetermined time (for example, about 30 seconds), and the multilayer body on which the underlying electrode layer is formed is spread on filter paper and subjected to heat treatment in an oven at about 150°C for a predetermined time (for example, about 30 minutes) to cause the fatty acid to set.

Alternatively, the layer over which a fatty acid is scattered on the underlying electrode layer may be formed by diluting a fatty acid with an organic solvent to prepare a solution, then applying the solution to the multilayer body on which the underlying electrode layer is formed, and causing the solution to thermally set. Here, the solution can be applied by, for example, dipping, spraying, or the like.

The relative intensity of secondary ions and the amount of carbon component of the fatty acid, the ratio of the area where the fatty acid is provided on the underlying electrode layer, and the thickness of the fatty acid can be controlled by, for example, controlling a solution concentration, an application method, an application time, and a temperature during application.

Case where Conductive Resin Layer is Provided

In a case where a conductive resin layer is provided in the external electrode, the conductive resin layer is formed as follows.

The conductive resin layer is formed on the underlying electrode layer.

As an example of a method for forming the conductive resin layer, a conductive resin paste including a resin component and a metal component is prepared and is applied onto the underlying electrode layer by, for example, a dipping method. Subsequently, heat treatment is performed at a temperature of, for example, greater than or equal to about 200° C. and less than or equal to about 550° ° C. to cause the resin to thermally set, thus forming the conductive electrode layer.

An atmosphere during the heat treatment is preferably, for example, an $N_2$ atmosphere.

Further, in order to prevent the resin from scattering and to prevent various metal components from oxidizing, an oxygen concentration is preferably, for example, less than or equal to about 100 ppm.

Next, a plating layer is formed on the surface of the underlying electrode layer. More specifically, a Ni plating layer is formed on the underlying electrode layer, and a Sn plating layer is formed on the Ni plating layer. For the plating processing, either electrolytic plating or electroless plating may be used. Electroless plating requires pretreatment with a catalyst or the like in order to increase a plating deposition rate, and has a disadvantage that the process becomes complicated. It is therefore usually preferable to use electrolytic plating. In a case where the conductive resin layer is formed, the plating layer is formed on the surface of the conductive resin layer.

Multilayer ceramic capacitor 10 according to the present preferred embodiment is manufactured as described above.

3. Example of Experiment

A multilayer ceramic capacitor that is a sample was prepared as a multilayer ceramic electronic component according to the manufacturing method described above, and a bending strength test was conducted to evaluate the effect of forming a fatty acid, and the presence or absence of a crack in a multilayer body was confirmed for evaluation.

(a) Specification of Sample of First Example

As the first example of a preferred embodiment of the present invention, a multilayer ceramic capacitor having the following specifications was prepared.

That is, a sample of the multilayer ceramic capacitor of the first example as illustrated in FIG. 2 was prepared as follows: a fatty acid was provided on an underlying electrode layer, a Ni plating layer was formed to cover the underlying electrode layer together with the fatty acid, and an Sn plating layer was further formed on the Ni plating layer.

Dimensions (design value) of multilayer ceramic capacitor: L×W×T=about 1.0 mm×about 0.5 mm×about 0.5 mm Material of principal component of ceramic layer: $BaTiO_3$ Capacity: about 10 nF Material of internal electrode layer: Ni Specification of external electrode layer Specification of underlying electrode layer Underlying electrode layer: Baked layer containing metal component and glass component Metal component: Cu Thickness of underlying electrode layer Thickness in length direction z at center in height direction x of underlying electrode layer located on first end surface and second end surface in cross section of multilayer body at ½ W position: about 28 μm Thickness in height direction x between first principal surface and second principal surface at center in length direction z of underlying electrode layer located on first principal surface and second principal surface in cross section of multilayer body at ½ W position (thickness of underlying electrode layer at center of e dimension): about 10 μm Thickness in width direction y between first lateral surface and second lateral surface at center in length direction z of underlying electrode layer located on first lateral surface and second lateral surface in cross section of multilayer body at ½ T position (thickness of underlying electrode layer at center of e dimension): about 10 μm Specification of fatty acid: An oleic acid was diluted with 2-propanol, only the underlying electrode layer was immersed for about 5 minutes, and then the chip was spread on an aluminum vat and set in an oven (about 150° C. for about 30 minutes).

Ratio of area where fatty acid is present to area of surface of underlying electrode layer: about 55% (the same applies to all surfaces from the viewpoint of design)
Relative intensity of secondary ions: about $6.75 \times 10^{-4}$
Carbon component amount: about 80 atom %
Position at which fatty acid was provided: Only surface on underlying electrode layer
Specification of plating layer: A plating layer had two layers in which a Ni plating layer was formed on the underlying electrode layer on which the fatty acid was disposed, and a Sn plating layer was formed on the Ni plating layer.
Thickness of Ni plating layer: about 3.5 μm
Thickness of Sn plating layer: about 3.0 μm (b) Specification of Sample of Second Example As the second example of a preferred embodiment of the present invention, a multilayer ceramic capacitor having the following specifications was prepared.

That is, a sample of the multilayer ceramic capacitor of the second example as illustrated in FIG. 9 was prepared as follows: a fatty acid was provided not only on an underlying electrode layer but also on a surface of a multilayer body between a first external electrode and a second external electrode, more specifically, on the surface of the multilayer body so as to bring a tip of a plating layer located on a first principal surface and a second principal surface, and a first lateral surface and a second lateral surface into contact with a surface of the fatty acid, a Ni plating layer as the plating layer was formed to cover the underlying electrode layer together with the fatty acid, and an Sn plating layer was further formed on the Ni plating layer.

Dimensions (design value) of multilayer ceramic capacitor: L×W×T=about 1.0 mm×about 0.5 mm×about 0.5 mm
Material of principal component of ceramic layer: $BaTiO_3$
Capacity: about 10 nF
Material of internal electrode layer: Ni
Specification of external electrode layer
Specification of underlying electrode layer
Underlying electrode layer: Baked layer containing metal component and glass component
Metal component: Cu
Thickness of underlying electrode layer
Thickness in length direction z at center in height direction x of underlying electrode layer located on first end surface and second end surface in cross section of multilayer body at ½ W position: about 28 μm
Thickness in height direction x between first principal surface and second principal surface at center in length direction z of underlying electrode layer located on first principal surface and second principal surface in cross section of multilayer body at ½ W position (thickness of underlying electrode layer at center of e dimension): about 10 μm
Thickness in width direction y between first lateral surface and second lateral surface at center in length direction z of underlying electrode layer located on first lateral surface and second lateral surface in cross section of multilayer body at ½ T position (thickness of underlying electrode layer at center of e dimension): about 10 μm
Specification of fatty acid: An oleic acid was diluted with 2-propanol, the multilayer body on which the underlying electrode layer is formed was immersed for about 5 minutes, and then the chip was spread on an aluminum vat and set in an oven (about 150° C. for about 30 minutes).
Ratio of area where fatty acid is present to area of surface of underlying electrode layer: about 55% (the same applies to all surfaces from the viewpoint of design)
Relative intensity of secondary ions: about $6.75 \times 10^{-4}$
Carbon component amount: about 80 atom %
Position at which fatty acid was provided: On underlying electrode layer and surface of multilayer body between external electrodes
Specification of plating layer: A plating layer had two layers in which a Ni plating layer was formed on the underlying electrode layer on which the fatty acid was disposed, and a Sn plating layer was formed on the Ni plating layer.
Thickness of Ni plating layer: about 3.5 μm
Thickness of Sn plating layer: about 3.0 μm (c) Specification of Sample of Third Example As the third example of a preferred embodiment of the present invention, a multilayer ceramic capacitor having the following specifications was prepared.

That is, a sample of the multilayer ceramic capacitor of the third example as illustrated in FIG. 9 was formed as follows: a fatty acid was provided not only on an underlying electrode layer but also on a surface of a multilayer body between a first external electrode and a second external electrode, more specifically, on the surface of the multilayer body so as to bring a tip of a plating layer located on a first principal surface and a second principal surface, and a first lateral surface and a second lateral surface into contact with a surface of the fatty acid and was made present on a surface of the multilayer body between the first external electrode and the second external electrode, a conductive resin layer including a metal component and a thermosetting resin component was formed, an Ni plating layer as the plating layer was formed to cover the underlying electrode layer together with the fatty acid, and an Sn plating layer was further formed on the Ni plating layer.

Dimensions (design value) of multilayer ceramic capacitor: L×W×T=about 1.0 mm×about 0.5 mm×about 0.5 mm
Material of principal component of ceramic layer: $BaTiO_3$
Capacity: about 10 nF
Material of internal electrode layer: Ni
Specification of external electrode layer
Specification of underlying electrode layer
Underlying electrode layer: Baked layer containing metal component and glass component
Metal component: Cu
Thickness of underlying electrode layer
Thickness in length direction z at center in height direction x of underlying electrode layer located on first end surface and second end surface in cross section of multilayer body at ½ W position: about 28 μm
Thickness in height direction x between first principal surface and second principal surface at center in length direction z of underlying electrode layer located on first principal surface and second principal surface in cross section of multilayer body at ½ W position (thickness of underlying electrode layer at center of e dimension): about 10 μm
Thickness in width direction y between first lateral surface and second lateral surface at center in length direction z of underlying electrode layer located on first lateral surface and second lateral surface in cross section of multilayer body at ½ T position (thickness of underlying electrode layer at center of e dimension): about 10 μm Specification of fatty acid: An oleic acid was diluted with 2-propanol, the multilayer body on which the underlying electrode layer is formed was immersed for about 5 minutes, and then the chip was spread on an aluminum vat and set in an oven (about 150° C. for about 30 minutes).

Ratio of area where fatty acid is present to area of surface of underlying electrode layer: about 55% (the same applies to all surfaces from the viewpoint of design)

Relative intensity of secondary ions: about $6.75 \times 10^{-4}$

Carbon component amount: about 80 atom %

Position at which fatty acid was provided: On underlying electrode layer and surface of multilayer body between external electrodes Specification of conductive resin layer Metal component: Ag-coated Cu Thermosetting resin component: Epoxy-based Thickness in length direction z at center in height direction x of conductive resin layer located on first end surface and second end surface in cross section of multilayer body at ½ W position: about 25 μm Thickness in height direction x between first principal surface and second principal surface at center in length direction z of conductive resin layer located on first principal surface and second principal surface in cross section of multilayer body at ½ W position (thickness of underlying electrode layer at center of e dimension): about 8 μm Thickness in width direction y between first lateral surface and second lateral surface at center in length direction z of conductive resin layer located on first lateral surface and second lateral surface in cross section of multilayer body at ½ T position (thickness of underlying electrode layer at center of e dimension): about 8 μm Specification of plating layer: A plating layer had two layers in which a Ni plating layer was formed on the underlying electrode layer on which the fatty acid was disposed, and a Sn plating layer was formed on the Ni plating layer.

Thickness of Ni plating layer: about 3.5 μm

Thickness of Sn plating layer: about 3.0 μm (d) Specification of Sample of Comparative Example As a comparative example, a multilayer ceramic capacitor with no fatty acid on an underlying electrode layer, that is, with an Ni plating layer formed on the underlying electrode layer, and an Sn plating layer further formed on the Ni plating layer was prepared. Therefore, the comparative example was designed so as to be the same or substantially the same in structure as the first example except that no fatty acid was provided.

(e) Method for Confirming Presence or Absence of Crack by Bending Strength Test

First, a multilayer ceramic capacitor as a sample was mounted on a mounting substrate having a thickness of about 1.6 mm using a solder paste. Subsequently, mechanical stress was applied to the mounting substrate on which the multilayer ceramic capacitor has yet to be mounted by bending the substrate with a push rod having a radius of curvature of about 1 μm from a back surface of the substrate. At this time, a bending amount was about 2 mm, and bending was performed for about 60 seconds. In this test, conditions were stricter than the AEC-Q200 standard required for in-vehicle use. After the substrate was bent, the multilayer ceramic capacitor was removed from the mounting substrate, and cross-section polishing was performed to observe the presence or absence of a crack inside the multilayer body. Cross-section polishing was performed to a position of about ½ W in width direction y between the first lateral surface and the second lateral surface of the multilayer ceramic capacitor so as to expose an LT surface of the multilayer ceramic capacitor. As each sample of the first to third examples and comparative example, 30 samples were prepared.

(f) Results

Table 1 shows results of confirming the presence or absence of a crack inside the multilayer body by the bending strength test for each sample of the first to third examples and comparative example.

TABLE 1

|  | Presence or absence of crack inside multilayer body (samples) |
| --- | --- |
| Comparative example | 18/30 |
| First example | 6/30 |
| Second example | 4/30 |
| Third example | 0/30 |

According to Table 1, for the samples of the comparative example, cracks inside the multilayer body were confirmed in 18 samples out of 30 samples by the bending strength test.

On the other hand, for the samples of the first example, when the fatty acid was provided only on the underlying electrode layer, cracks inside the multilayer body were confirmed in 6 samples out of 30 samples, and a favorable result was produced as comparted with the samples of the comparative example.

Further, for the samples of the second example, when the fatty acid was provided on the underlying electrode layer and the surface of the multilayer body, cracks inside the multilayer body were confirmed in 4 samples out of 30 samples, and a favorable result was produced as compared with the samples of the first example.

Furthermore, for the samples of the third example, when the fatty acid was provided on the underlying electrode layer, and the conductive resin layer was provided on the surface of the underlying electrode layer to cover the underlying electrode layer, no cracks inside the multilayer body were confirmed in 30 samples, and a favorable result was produced as compared with the samples of the first example and the second example.

From the above results, with the structure of the multilayer ceramic capacitor of the first example, the fatty acid is provided at least on the surface of the underlying electrode layer, the carboxy group of the fatty acid is ionized and adsorbed to the underlying electrode layer by the ion binding force, and plating of the plating layer provided on the underlying electrode layer is reduced or prevented from being deposited at the adsorption portion, thus allowing a reduction in bonding area between the underlying electrode layer and the plating layer. Accordingly, adhesion between the underlying electrode layer and the plating layer is reduced, so that it is expected that an advantageous effect of making the underlying electrode layer and the plating layer formed on the underlying electrode layer easy to separate from each other will be provided.

Therefore, when an impact upon dropping or an impact caused by thermal cycles is applied to the multilayer ceramic capacitor, the underlying electrode layer and the plating layer can be stably separated, and stress can be released accordingly. As a result, it was confirmed that the multilayer body of the multilayer ceramic capacitor can be prevented from cracking.

In the structure of the multilayer ceramic capacitor of the first example, a thermosetting resin layer as disclosed in Japanese Patent Laying-Open No. H11-162771 is not provided, which enables not only a reduction in cost, but also an increase in degree of freedom in design of the multilayer body by the thickness of the thermosetting resin layer, and thus allows an increase in capacity.

Further, according to the structure of the multilayer ceramic capacitor of the second example, the fatty acid provided on the surface of the multilayer body between the external electrodes defines and functions cushion between the as a multilayer body and the plating layer to allow a non-adhesive region to be provided between the plating layer and the surface of the multilayer body, and brings the tip of the plating layer out of contact with the surface of the multilayer body, so that it is possible to make separation easier. Accordingly, it was confirmed that the underlying electrode layer and the plating layer can easily separate from each other with higher stability.

Furthermore, according to the structure of the multilayer ceramic capacitor of the third example, the fatty acid is provided on the underlying electrode layer and the surface of the multilayer body between the external electrodes, and the conductive resin layer is provided to cover the underlying electrode layer, so that it was confirmed that the conductive resin layer defines and functions as a buffer layer and can further reduce or prevent the multilayer ceramic capacitor from cracking.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a multilayer body including a plurality of ceramic layers that are laminated, the multilayer body including a first principal surface and a second principal surface on opposite sides of the multilayer body in a height direction, a first lateral surface and a second lateral surface on opposite sides of the multilayer body in a width direction orthogonal or substantially orthogonal to the height direction, and a first end surface and a second end surface on opposite sides of the multilayer body in a length direction orthogonal or substantially orthogonal to the height direction and the width direction;
a first internal electrode layer on the plurality of ceramic layers and exposed to the first end surface;
a second internal electrode layer on the plurality of ceramic layers and exposed to the second end surface;
a first external electrode electrically connected to the first internal electrode layer and located on the first end surface, a portion of the first principal surface, a portion of the second principal surface, a portion of the first lateral surface, and a portion of the second lateral surface; and
a second external electrode electrically connected to the second internal electrode layer and located on the second end surface, a portion of the first principal surface, a portion of the second principal surface, a portion of the first lateral surface, and a portion of the second lateral surface; wherein
the first external electrode and the second external electrode each include an underlying electrode layer including a metal component, and a plating layer on the underlying electrode layer; and
a fatty acid is provided on at least a surface of the underlying electrode layer.

2. The multilayer ceramic electronic component according to claim 1, wherein the fatty acid is provided on a surface of the multilayer body between the first external electrode and the second external electrode.

3. The multilayer ceramic electronic component according to claim 1, wherein the fatty acid includes at least one of a palmitic acid, an oleic acid, a stearic acid, or a myristic acid.

4. The multilayer ceramic electronic component according to claim 1, wherein a relative intensity of secondary ions derived from the fatty acid provided on the underlying electrode layer or derived from the fatty acid provided on the surface of the multilayer body between the first external electrode and the second external electrode is greater than or equal to about $8.07 \times 10^{-5}$ and less than or equal to about $1.27 \times 10^{-3}$.

5. The multilayer ceramic electronic component according to claim 1, wherein an amount of a carbon component derived from the fatty acid provided on the underlying electrode layer or derived from the fatty acid provided on the surface of the multilayer body between the first external electrode and the second external electrode is greater than or equal to about 74 atom % and less than or equal to about 82 atom %.

6. The multilayer ceramic electronic component according to claim 1, wherein a conductive resin layer including a metal component and a thermosetting resin component is provided between the underlying electrode layer and the plating layer.

7. The multilayer ceramic electronic component according to claim 1, wherein the multilayer body has a dimension in the length direction of greater than or equal to about 0.186 mm and less than or equal to about 9.59 mm, a dimension in the width direction of greater than or equal to about 0.086 mm and less than or equal to about 9.59 mm, and a dimension in the height direction of greater than or equal to about 0.086 mm and less than or equal to about 9.59 mm.

8. The multilayer ceramic electronic component according to claim 1, wherein each of the plurality of ceramic layers includes at least one of $BaTiO_3$, $CaTio_3$, $SrTiO_3$, or $CaZro_3$ as a principal component.

9. The multilayer ceramic electronic component according to claim 8, wherein each of the plurality of ceramic layers includes an accessory component smaller in content than the principal component of at least one of an Mn compound, an Fe compound, a Cr compound, a Co compound, or an Ni compound.

10. The multilayer ceramic electronic component according to claim 1, wherein a thickness of each of the plurality of ceramic layers is greater than or equal to about 0.5 μm and less than or equal to about 15 μm.

11. The multilayer ceramic electronic component according to claim 1, wherein a number of the plurality of ceramic layers is greater than or equal to 10 and less than or equal to 700.

12. The multilayer ceramic electronic component according to claim 1, wherein each of the first and second internal electrode layers includes Ni, Cu, Ag, Pd, or Au, or an alloy including at least one of Ni, Cu, Ag, Pd, or Au.

13. The multilayer ceramic electronic component according to claim 1, wherein a thickness of each of the first and second internal electrode layers is about 0.2 μm and less than or equal to about 2.0 μm.

14. The multilayer ceramic electronic component according to claim 1, wherein the metal component of the underlying electrode layer includes at least one of Cu, Ni, Ag, Pd, an Ag—Pd alloy, or Au.

15. The multilayer ceramic electronic component according to claim 14, wherein the underlying electrode layer includes a glass component.

16. The multilayer ceramic electronic component according to claim 15, wherein the glass component includes at least one of B, Si, Ba, Mg, Al, or Li.

17. The multilayer ceramic electronic component according to claim 14, wherein the underlying electrode layer includes a ceramic component.

18. The multilayer ceramic electronic component according to claim 17, wherein the ceramic component includes at least one of $BaTiO_3$, $CaTiO_3$, $(Ba, Ca)TiO_3$, $SrTiO_3$, or $CaZrO_3$.

* * * * *